(12) United States Patent
Mizushima et al.

(10) Patent No.: US 8,251,521 B2
(45) Date of Patent: Aug. 28, 2012

(54) PROJECTOR HAVING A PROJECTION ANGLE ADJUSTING MECHANISM

(75) Inventors: Tetsuro Mizushima, Osaka (JP); Kazuhisa Yamamoto, Osaka (JP); Akira Kurozuka, Osaka (JP); Kakuya Yamamoto, Hyogo (JP); Keiji Sugiyama, Kyoto (JP)

(73) Assignee: Panasonic Corporation, Osaka (JP)

( * ) Notice: Subject to any disclaimer, the term of this patent is extended or adjusted under 35 U.S.C. 154(b) by 234 days.

(21) Appl. No.: 12/677,959

(22) PCT Filed: Sep. 3, 2008

(86) PCT No.: PCT/JP2008/002407
§ 371 (c)(1),
(2), (4) Date: Mar. 12, 2010

(87) PCT Pub. No.: WO2009/034694
PCT Pub. Date: Mar. 19, 2009

(65) Prior Publication Data
US 2010/0220293 A1    Sep. 2, 2010

(30) Foreign Application Priority Data

Sep. 14, 2007    (JP) ................................ 2007-238786

(51) Int. Cl.
*G03B 21/28* (2006.01)
(52) U.S. Cl. ............... 353/98; 353/11; 353/12; 353/13; 353/14; 353/15; 353/99; 353/119; 353/122
(58) Field of Classification Search .................... 353/20, 353/31, 33, 34, 37, 46, 48, 49, 69, 70, 119; 385/115, 116, 118, 119, 901; 372/6, 25, 372/372/26, 101; 349/5–9; 352/244, 198, 352/203
See application file for complete search history.

(56) References Cited

U.S. PATENT DOCUMENTS
5,053,765 A    10/1991 Sonehara et al.
(Continued)

FOREIGN PATENT DOCUMENTS
JP    2-59704    2/1990
(Continued)

OTHER PUBLICATIONS

International Search Report issued Oct. 7, 2008 in International (PCT) Application No. PCT/JP2008/002407.

*Primary Examiner* — Georgia Y Epps
*Assistant Examiner* — Sultan Chowdhury
(74) *Attorney, Agent, or Firm* — Wenderoth, Lind & Ponack, L.L.P.

(57) ABSTRACT

A multipurpose projector is provided with a fiber bundle including a plurality of cores fixedly arranged on an input plane and an output plane, laser beam sources for emitting laser beams having directivities, an optical guide unit for modulating the laser beams emitted from the laser beam sources and guiding the modulated laser beams to the input plane of the fiber bundle, a projection lens for enlarging and projecting the laser beams emerging from the output plane of the fiber bundle to a display space, and a projection angle adjusting mechanism disposed on the side of the output plane of the fiber bundle for adjusting projection angles of the laser beams projected from the projection lens. Thus, the projector can have its projection space freely operated and enlarged to extend its application not only to image display, but also to illumination and decoration with colored light.

22 Claims, 12 Drawing Sheets

U.S. PATENT DOCUMENTS

| | | | |
|---|---|---|---|
| 5,700,076 A * | 12/1997 | Minich et al. | 353/31 |
| 5,727,098 A * | 3/1998 | Jacobson | 385/31 |
| 6,188,482 B1 * | 2/2001 | Cloud | 356/491 |
| 6,392,821 B1 * | 5/2002 | Benner, Jr. | 359/727 |
| 6,480,634 B1 * | 11/2002 | Corrigan | 385/4 |
| 6,594,090 B2 * | 7/2003 | Kruschwitz et al. | 359/707 |
| 6,886,945 B2 | 5/2005 | Nishida et al. | |
| 7,237,903 B2 | 7/2007 | Nagayoshi | |
| 7,953,308 B2 * | 5/2011 | Fomitchov | 385/116 |
| 2003/0142934 A1 * | 7/2003 | Pan et al. | 385/116 |
| 2003/0202630 A1 * | 10/2003 | Chen | 378/62 |
| 2004/0201826 A1 | 10/2004 | Nishida et al. | |
| 2005/0168698 A1 | 8/2005 | Nagayoshi | |
| 2008/0158512 A1 | 7/2008 | Mizushima et al. | |
| 2009/0316116 A1 * | 12/2009 | Melville et al. | 353/31 |
| 2010/0073638 A1 * | 3/2010 | Yagyu | 353/31 |
| 2010/0165301 A1 * | 7/2010 | Kojima et al. | 353/38 |

FOREIGN PATENT DOCUMENTS

| | | |
|---|---|---|
| JP | 3-3491 | 1/1991 |
| JP | 4-191827 | 7/1992 |
| JP | 7-43702 | 2/1995 |
| JP | 2004-272029 | 9/2004 |
| JP | 2005-18013 | 1/2005 |
| JP | 2005-215542 | 8/2005 |
| JP | 2006-106298 | 4/2006 |
| JP | 2007-140009 | 6/2007 |
| WO | 2006/090857 | 8/2006 |

* cited by examiner

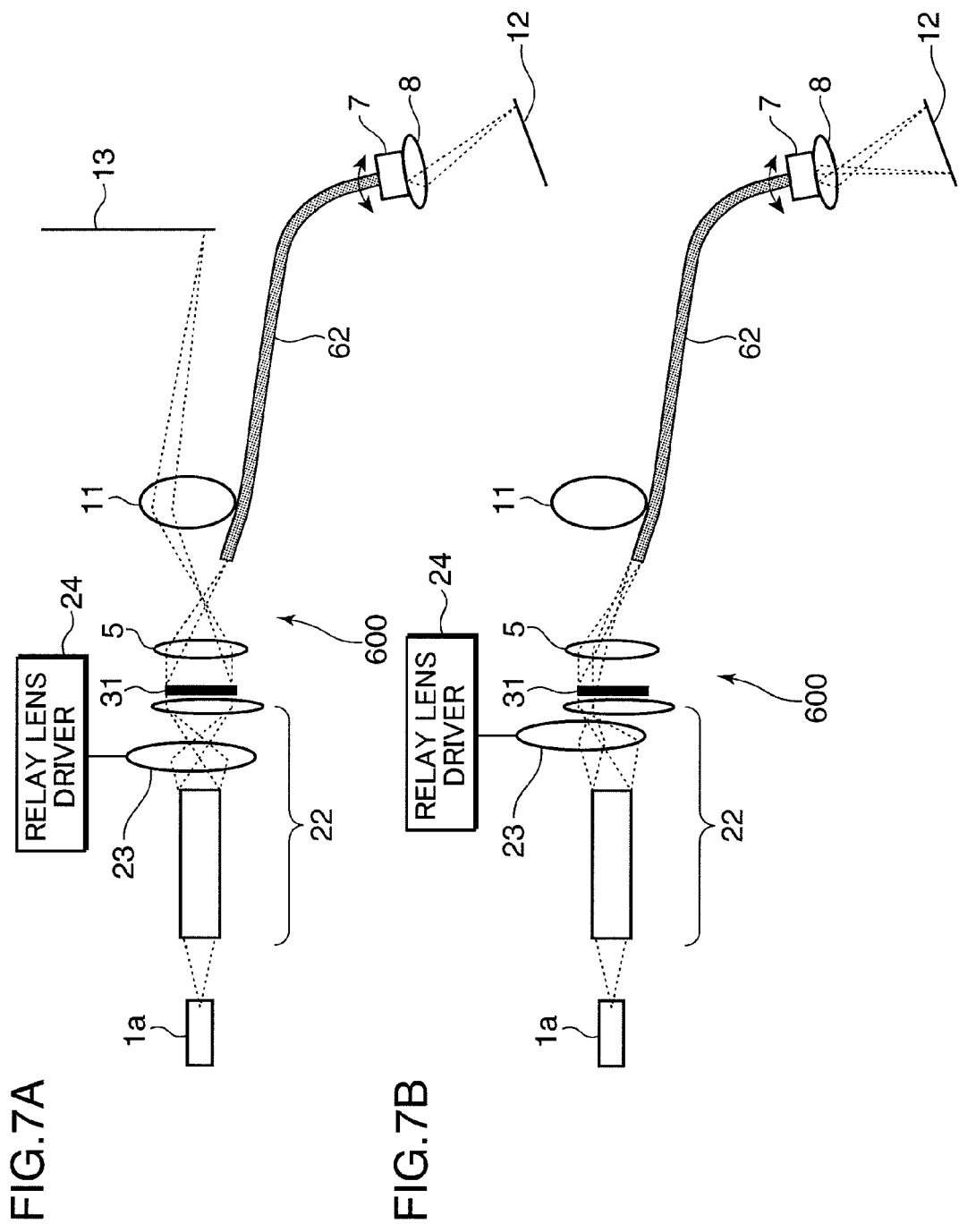

PROJECTOR HAVING A PROJECTION ANGLE ADJUSTING MECHANISM

TECHNOLOGICAL FIELD

The present invention relates to a projector for projecting an image and information.

BACKGROUND ART

Augmented reality as technology for augmenting sensory perception for reality with additional information by projecting or relating a virtual space to reality is being studied. Augmented reality is expected to be applied as a task support and entertainment in a reality environment. The projection of images (information) to a reality environment by a projector is used as one means for adding information to the reality environment in an augmented reality.

However, image projection positions are limited in a conventional projector and a main body needs to be moved and adjusted in the case of changing a projection position, thereby presenting a problem of limiting a display space for realizing an augmented reality.

As a method proposed thus far for moving an image projection position of a projector, a projection lens is shifted and pixels of a spatial modulation element are selectively used as disclosed in patent literature 1. However, the moving method of patent literature 1 enables only movements to projection positions in a very limited range and is merely used to adjust the projection position.

A projector can not only display information in a projection space, but also illuminate and decorate the projection space with colored light. However, there is a problem of a limited projection space due to the above problems of moving the main body and making adjustments, which problems accompany a change of the image projection position.

Conventional projectors have a problem of a limited projection space (display space) as means for realizing an augmented reality, means for presenting information and images and means for illumination and decoration.

Patent Literature 1:
  Japanese Unexamined Patent Publication No. 2005-215542

DISCLOSURE OF THE INVENTION

The present invention was developed to solve the above problems and an object thereof is to provide a projector capable of freely operating and augmenting a projection space thereof and extending its application not only to image display, but also to illumination and decoration with colored light.

One aspect of the present invention is directed to a projector, comprising a fiber bundle including a plurality of cores fixedly arranged on an input plane and an output plane; a laser beam source for emitting a laser beam having a directivity; an optical guide unit for modulating the laser beam emitted from the laser beam source and guiding the modulated laser beam to the input plane of the fiber bundle; a projection lens for enlarging and projecting the laser beam emerging from the output plane of the fiber bundle to a display space; and a projection angle adjusting mechanism disposed on an end of the fiber bundle on the side of the output plane for adjusting a projection angle of the laser beam projected from the projection lens.

According to this construction, the fiber bundle includes the plurality of cores fixedly arranged on the input plane and the output plane. A laser beam having a directivity is emitted from the laser beam source, and the laser beam emitted from the laser beam source is modulated and the modulated laser beam is guided to the input plane of the fiber bundle by the optical guide unit. The laser beam emerging from the output plane of the fiber bundle is enlarged and projected to the display space by the projection lens. The projection angle of the laser beam projected from the projection lens is adjusted by the projection angle adjusting mechanism disposed on the end of the fiber bundle on the side of the output plane.

Since the projection angle of the laser beam projected from the projection lens is adjusted, the projector can have its projection space freely operated and enlarged to extend its application not only to image display, but also to illumination and decoration with colored light.

Objects, features and advantages of the present invention will become more apparent by the following detailed description and accompanying drawings.

BRIEF DESCRIPTION OF THE DRAWINGS

FIGS. 7A and 7B are schematic construction diagrams of a multipurpose projector according to a sixth embodiment of the invention.

BEST MODES FOR EMBODYING THE INVENTION

Embodiments of the present invention are described below with reference to the accompanying drawings. The following embodiments are specific examples of the present invention and not of the nature to limit the technical scope of the present invention.

(First Embodiment)

Figure 1:
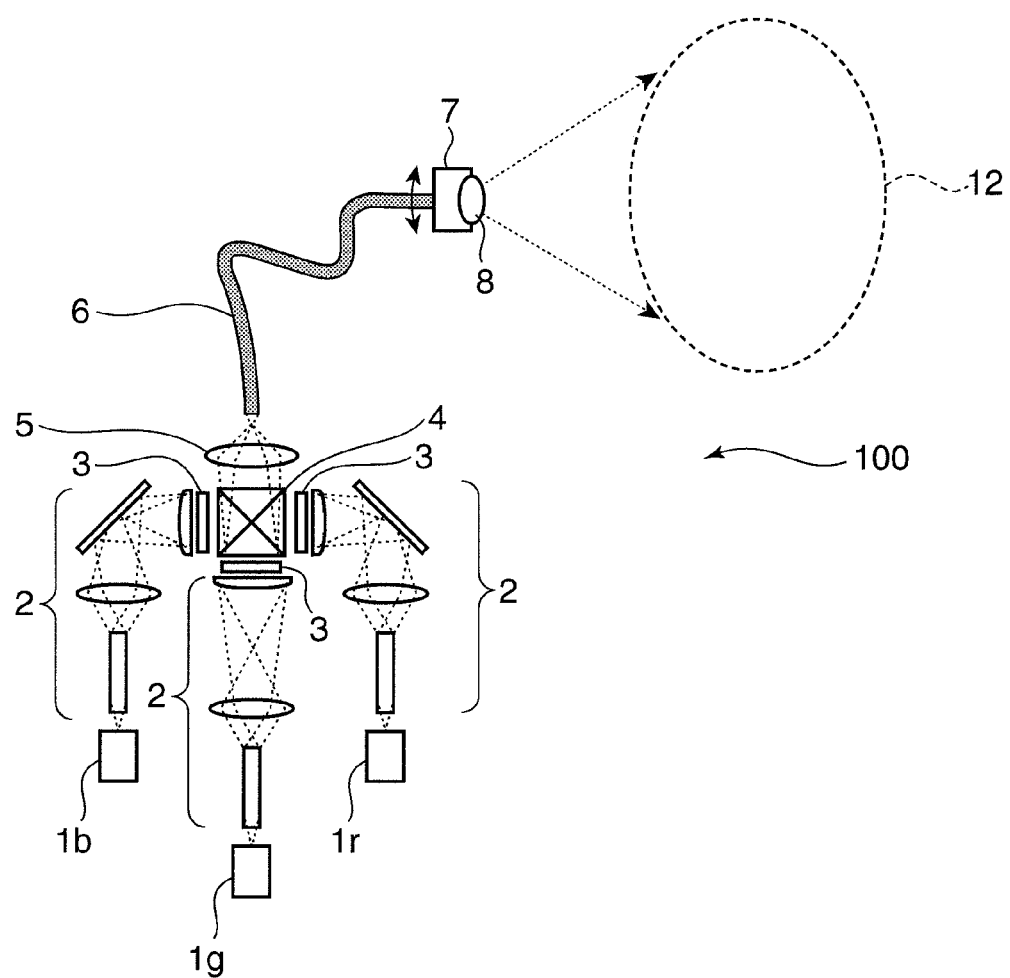
FIG. 1 is a schematic construction diagram of a multipurpose projector according to a first embodiment of the invention.
Figure 2:
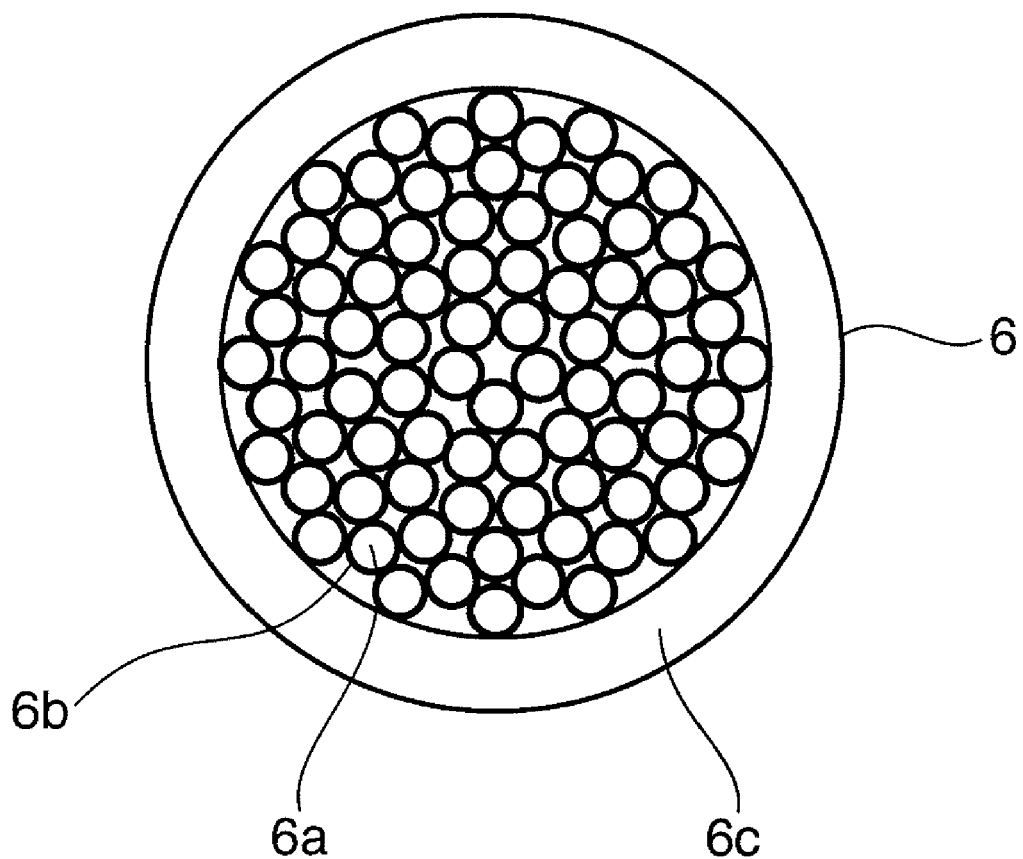
FIG. 2 is a schematic section of an input/output plane of a fiber bundle according to the first embodiment of the invention.

FIG. 1 is a schematic construction diagram of a multipurpose projector 100 according to a first embodiment of the present invention, and FIG. 2 is a schematic section of an input/output plane of a fiber bundle 6 according to the first embodiment of the present invention.

The multipurpose projector 100 shown in FIG. 1 is provided with laser beam sources 1r, 1g and 1b, an illumination optical system 2, a spatial modulation element 3, a multiplexing prism 4, a reduction projection optical system 5, a fiber bundle 6, a projection angle adjusting mechanism 7 and a projection lens 8. In this embodiment, the laser beam sources 1r, 1g and 1b correspond to an example of a laser beam source and the illumination optical system 2, the spatial modulation element 3, the multiplexing prism 4 and the reduction projection optical system 5 correspond to an example of an optical guide unit.

The laser beam source 1r emits a red laser beam having a directivity, the laser beam source 1g emits a green laser beam having a directivity and the laser beam source 1b emits a blue laser beam having a directivity. The respective red, green and blue laser beams emitted from the laser beam sources 1r, 1g and 1b are shaped by the illumination optical system 2 to illuminate the spatial modulation element 3. In the first embodiment, the illumination optical system 2 is comprised of a rod integrator and a relay lens and shapes the respective red, green and blue laser beams to have rectangular and uniform intensity distributions suitable for the illumination of the spatial modulation element 3.

The spatial modulation element 3 is comprised of a transmissive liquid crystal and a polarizing plate, modulates the laser beams of the respective colors and emits two-dimensionally modulated laser beams. The modulated red, green and blue laser beams are so multiplexed by the multiplexing prism 4 as to have the axes thereof aligned and incident on the reduction projection optical system 5. The reduction projection optical system 5 reduces and images the modulated laser beams on an input plane of the fiber bundle 6 and guides the modulated laser beams to respective cores of the fiber bundle 6.

The fiber bundle 6 has a bundled structure of fibers as shown in FIG. 2 and includes a plurality of cores 6a, a cladding 6b and a coating 6c. The respective cores 6a are covered by the cladding 6b having a lower refractive index than the cores 6a. In the fiber bundle 6, the cladding 6b is present between the cores 6a. Claddings 6b may be separated without being shared by the respective cores 6a and void spaces or spaces filled with another resin material may be present between the claddings 6b. The coating 6c covers the plurality of cores 6a and the cladding 6b.

In the fiber bundle 6 of this embodiment, arrangements of the cores 6a in light input plane and output plane are determined and an image on the input plane can be transmitted to the output plane. The fiber bundle 6 is bendable and can be handled as one wire material together with the coating 6c. The cladding 6b between the plurality of cores 6a is preferably minimized in size in order to increase input efficiency. It is sufficient for the fiber bundle 6 to include the plurality of cores 6a and to be able to guide light, and the material and shape of the fiber bundle 6 are not particularly limited.

The projection angle adjusting mechanism 7 is disposed on the side of the output plane of the fiber bundle 6 and freely adjusts projection angles of the laser beams to be projected from the projection lens 8 via the fiber bundle 6. The projection lens 8 is disposed on the output plane of the fiber bundle 6. The projection lens 8 enlarges and projects the modulated laser beams guided by the fiber bundle 6 to a display space 12.

The display space 12 for displaying the modulated laser beams can be arbitrarily moved by the projection angle adjusting mechanism 7.

Although the projection angle adjusting mechanism 7 in this embodiment can integrally move the output plane of the fiber bundle 6 and the projection lens 8, the present invention is not particularly limited to this and only the output plane of the fiber bundle 6 may be moved.

The laser beams guided by the fiber bundle 6 have directivities. Thus, light can be coupled to the cores 6a of the fiber bundle 6 with high efficiency while image information is given to the laser beams through modulation. The light that can be input to the fiber bundle 6 is determined by a total area of the cores 6a and a fiber numerical aperture determined by the refractive indices of the cores 6a and the cladding 6b. By using the laser beam sources, the total area of the cores 6a can be small and light can be coupled with high efficiency while the fiber bundle 6 is permitted to be bendable.

The multipurpose projector 100 of this embodiment is provided with the fiber bundle 6 including the plurality of cores 6a fixedly arranged on the input and output planes, the projection lens 8 for enlarging and projecting the laser beams emerging from the fiber bundle 6 to the display space, and the projection angle adjusting mechanism 7 disposed on the side of the output plane of the fiber bundle 6 for adjusting the projection angles of the laser beams to be projected from the projection lens 8. Thus, the modulated light can be enlarged and projected to the arbitrary display space 12. Further, the display space 12 can be simultaneously limited by a modulation pattern of the laser beams, wherefore the display space 12 can be freely operated. The modulation pattern of the laser beams can illuminate the display space and decorate the space with colored light in addition to displaying an image and adding information to the display space.

In conventional projectors, image projection positions were limited and it was difficult to change/adjust a display space. However, the multipurpose projector 100 of this embodiment can freely operate and enlarge the display space 12 thereof to extend its application not only to image display, but also illumination, decoration and the like of a space with colored light.

For example, by installing the multipurpose projector 100 of this embodiment on the ceiling of a room, it is possible to illuminate an arbitrary place of the room, use a desktop or a wall as a display and realize an augmented reality in the room.

Although the laser beam sources 1r, 1g and 1b of three colors of red, green and blue are used in the multipurpose projector 100, a laser beam source of only one color or laser beam sources of four or more colors may be used. Laser beam sources having directivities such as semiconductor lasers, solid-state lasers, gas lasers and wavelength conversion lasers can be used as the laser beam sources 1r, 1g and 1b. The laser beam source of one color may be a laser beam source including a plurality of laser emission apertures, and a plurality of emitted laser beams may not have the same center wavelength. It is preferable to satisfy a relationship defined by the following equation (1) when $\theta_L$ denotes a $1/e^2$ spreading half angle of a laser beam emitted from the laser beam source of one color, $S_L$ denotes an emission aperture area of the laser beam source, $S_F$ denotes a cross-sectional area of the fiber bundle 6 excluding the coating 6c and $NA_F$ denotes a numerical aperture of the fiber bundle 6.

$$S_L \times (\sin \theta_L)^2 < S_F \times (NA_F)^2 \tag{1}$$

By satisfying the relationship of the above equation (1), the input efficiency of the laser beams to the fiber bundle 6 can be increased.

The illumination optical system 2 may shape the beams so that the light intensity distributions are suitable for the spatial modulation element 3 and can take various constructions. In other words, a holographic optical element and the like can be used besides the rod integrator. Further, in the case of not using the spatial modulation element 3, the illumination optical system 2 may be omitted.

It is sufficient for the spatial modulation element 3 to modulate the laser beams and a transmissive liquid crystal, a reflective liquid crystal or a mirror device such as a DMD (Digital Micromirror Device) can be used as such. When light is modulated using the spatial modulation element 3 as in the first embodiment, a screen size $S_s$ of the spatial modulation element 3, a laser beam emission numerical aperture $NA_s$ of the spatial modulation element 3, the cross-sectional area $S_F$ of the fiber bundle 6 excluding the coating 6c and the numerical aperture $NA_F$ of the fiber bundle 6 preferably satisfy the following equations (2) and (3).

$$S_S \times (NA_S)^2 < 4 \times S_F \times (NA_F)^2 \qquad (2)$$

$$NA_S < 0.1 \qquad (3)$$

By satisfying the above equations (2) and (3), input efficiency of the modulated laser beams to the fiber bundle 6 can be maintained high and the miniaturization of an optical component between the spatial modulation element 3 and the fiber bundle 6 can be realized.

A pixel number of the spatial modulation element 3 and a total number of the cores of the fiber bundle 6 need not coincide and may differ. It is not necessary to strictly position the pixels and the cores in a one-to-one relationship. An arrangement of the cores of the fiber bundle 6 is preferably non-periodically displaced with respect to an arrangement of the pixels of the spatial modulation element 3. By non-periodically displacing the cores, moire in a projected image can be prevented.

For example, the cores of the fiber bundle 6 can be non-periodically arranged by randomly and most densely filling a plurality of fibers whose core diameters differ in a range of ±1 μm within the coating. By randomly changing draw lengths of the respective cores upon producing the fiber bundle 6, the core diameters in the fiber bundle 6 randomly vary and the cores of the fiber bundle 6 can be non-periodically arranged. Further, also by arranging the cores such that the core diameters are larger in an outer peripheral part than in a central part of the fiber bundle 6 as described later, the cores of the fiber bundle 6 can be non-periodically arranged.

The pixel number of the spatial modulation element 3 is preferably greater than the total number of the cores of the fiber bundle 6. In this way, moire in a projected image can be prevented, and laser beams can be projected while a reduction of pixel information at the time of modulation by the spatial modulation element 3 is compensated for by retaining incident angle distribution information to the cores from the spatial modulation element 3 in the fiber bundle 6.

The reduction projection optical system 5 of the first embodiment reduces and projects an image of the spatial modulation element 3 and focuses it on the input plane of the fiber bundle 6. By focusing the image of the spatial modulation element 3 on the input plane, a high-quality image in focus can be transmitted. Although the reduction projection optical system 5 is a single lens in FIG. 1, it may be comprised of a plurality of lenses. The reduction projection optical system 5 preferably has a magnification changing function (zooming function). When the pixel number of the spatial modulation element 3 and the total number of the cores of the fiber bundle 6 do not coincide, the zooming function of the reduction projection optical system 5 can change an information range and a resolution necessary for an image to be projected.

In the fiber bundle 6 of the first embodiment, the cores 6a are composed of $GeO_2$-doped quartz and the cladding 6a between the cores is composed of F-doped quartz. For example, in the fiber bundle 6 of the first embodiment, the number of the cores is 100,000, the fiber numerical aperture is 0.35 and the fiber cross-sectional area is 1.8 mm². For example, in the spatial modulation element 3 of the first embodiment, the resolution is 300,000 pixels as VGA (Video Graphics Array) standard, a screen size is 44 mm² and the emission numerical aperture is 0.06, so that the above equations (2) and (3) are satisfied.

In the first embodiment, a semiconductor laser having a wavelength of 635 nm is used as the red laser beam source 1r, a wavelength conversion laser having a wavelength of 532 nm is used as the green laser beam source 1g and a semiconductor laser having a wavelength of 445 nm is used as the blue laser beam source 1b. The red laser beam source 1r has a largest area and includes six emission apertures, wherein an emission aperture area is 900 μm² and divergence angles are 40° and 10°. However, the above relationships between the fiber bundle 6 and the laser beam source 1r are satisfied.

The fibers of the fiber bundle 6 are preferably multi-mode fibers. By using the multi-mode fibers, the input efficiency can be high and coherence between modes can be reduced while light is guided in the fibers. The length of the fiber bundle 6 is preferably 1 m or longer. By setting the length at 1 m or longer, a reduction of the above coherence can be realized and the projection angle adjusting mechanism 7 can smoothly perform its operation by loosening the fiber bundle 6 (providing a bent portion) between the input and output planes. The lengths of the adjacent cores of the fiber bundle 6 from the input plane to the output plane may differ. Although the laser beams from the adjacent cores are displayed in an overlapping manner in the display space, coherence at this time can be reduced to prevent coherence noise such as speckle noise.

The projection angle adjusting mechanism 7 includes a two-axis angle adjusting mechanism and can freely adjust a direction of the output plane of the fiber bundle 6 in an angle adjustment range. The fiber bundle 6 is loosened from an input end to an output end as shown in FIG. 1, so that no large stress acts even if the projection angle is adjusted. The projection angle adjusting mechanism 7 moves the projection lens 8 together with the output plane of the fiber bundle 6 to adjust the projection angle. In the first embodiment, the projection angle adjusting mechanism 7 uses a two-axis gonio stage.

Specifically, a coverage angle adjusting mechanism in a monitoring camera or the like is, for example, used, the output end of the fiber bundle 6 and the projection lens 8 are integrally mounted on the two-axis gonio stage capable of changing an angle in vertical and lateral directions, and the respective stages are rotated by specified angles by a driver. The angle may be changed in vertical and lateral directions, for example, by integrally mounting the output end of the fiber bundle 6 and the projection lens 8 on one end of a wire such as in an endoscope and pulling the other end of the wire by a driver.

The projection angle adjusting mechanism 7 can simultaneously increase an area to be irradiated and the number of display pixels by being quickly operated. At this time, an operation frequency of the projection angle adjusting mechanism 7 is preferably 10 Hz or higher.

The projection angle adjusting mechanism 7 preferably includes a mechanism for moving the output end of the fiber bundle 6 in a lengthwise direction of the fiber bundle 6. By moving the output end of the fiber bundle 6, a distance between the output end of the fiber bundle 6 and the projection lens 8 can be changed and a change of an illumination angle for the display space 12 and image zooming can be freely performed. In this embodiment, the projection angle adjusting mechanism 7 may not only move the output end of the fiber bundle 6 in the lengthwise direction of the fiber bundle 6, but also move the projection lens 8 in the lengthwise direction of the fiber bundle 6.

The projection angle adjusting mechanism 7 repeatedly vibrates the projection lens 8 during a period of projecting laser beams from the projection lens and adjusts the projection angle of the projection lens 8 during the movement of the display space. Since laser beams are coherent, granular noise called speckle noise is likely to occur in a projected image. Also in the multipurpose projector 100 of this embodiment, speckle noise needs to be removed. The projection angle adjusting mechanism 7 can remove the speckle noise by causing the projection lens 8 to repeatedly make microscopic movements in the order of μm during image projection and temporally averaging the speckle noise. The mechanism for vibrating the projection lens 8 can be easily realized by using a driver such as a piezoelectric element or an ultrasonic motor.

The projection lens 8 is comprised of a plurality of lenses and enlarges and projects an image of the output end of the fiber bundle 6 to the display space. The projection lens 8 includes an auto-focusing mechanism and performs a focus adjustment as the display space 12 is moved. This enables a high-quality image to be displayed while the display space 12 is changed. The projection lens 8 may also include an auto-zooming function. This leads to increased convenience by enlarging or reducing an image to a size intended by a user.

In the case of using the multipurpose projector 100 of this embodiment for illumination, illumination is carried out by not only changing the modulation pattern of the laser beams, but also setting the projection lens 8 in a defocus state. In this case, the projection angle adjusting mechanism 7 causes the display space 12 to be illuminated in the defocus state by relatively changing the distance between the output plane of the fiber bundle 6 and the projection lens 8. Since the display space 12 is illuminated in the defocus state, dark parts caused by the cladding of the fiber bundle 6 disappear and the display space 12 can be uniformly illuminated.

(Second Embodiment)

Figure 3:
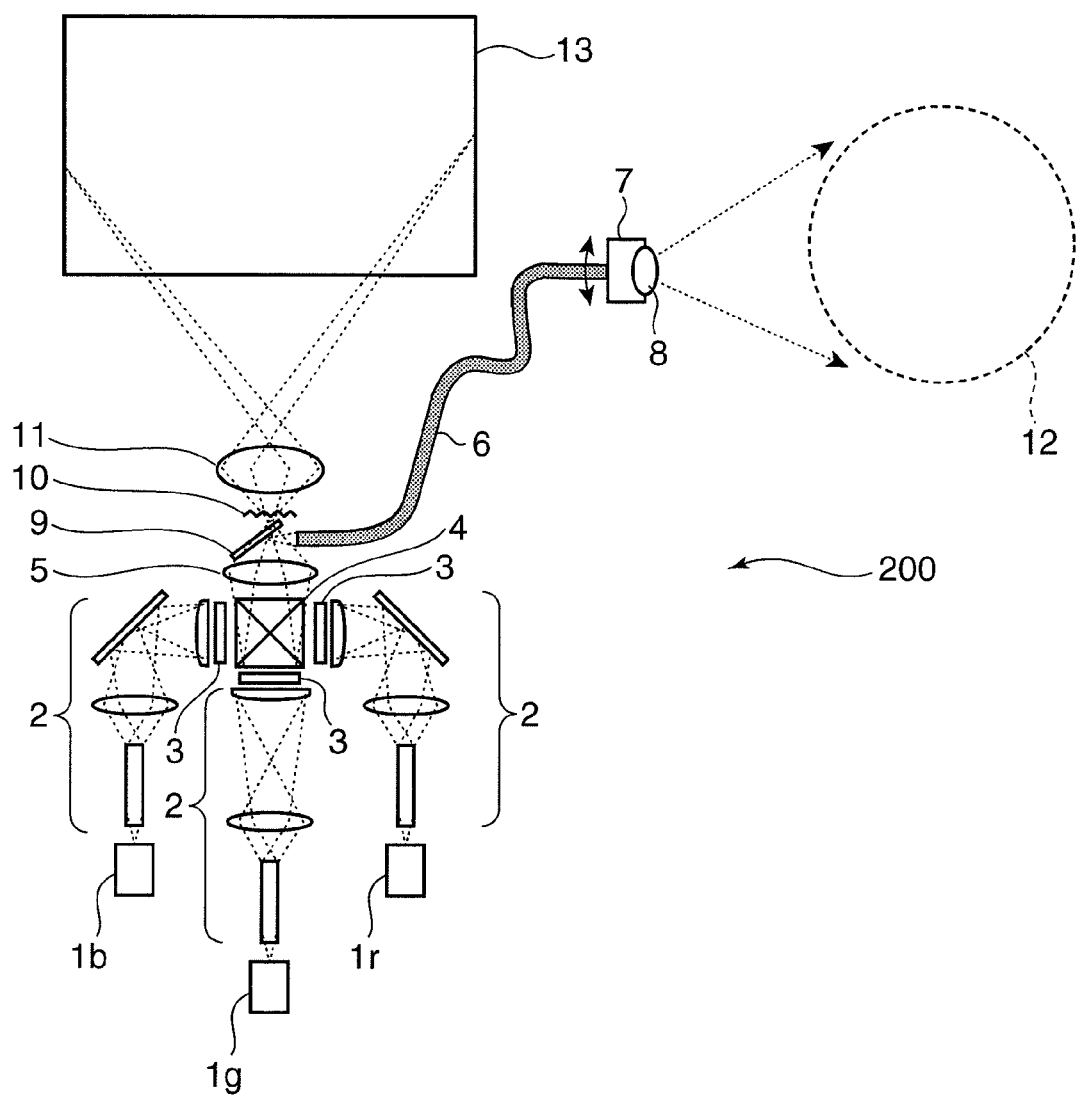
FIG. 3 is a schematic construction diagram of a multipurpose projector according to a second embodiment of the invention.

FIG. 3 is a schematic construction diagram of a multipurpose projector 200 according to a second embodiment of the present invention. In FIG. 3, the same construction as the first embodiment is identified by the same reference numerals and not described.

The multipurpose projector 200 shown in FIG. 3 is provided with laser beam sources 1r, 1g and 1b, an illumination optical system 2, a spatial modulation element 3, a multiplexing prism 4, a reduction projection optical system 5, a fiber bundle 6, a projection angle adjusting mechanism 7, a projection lens 8, a switching element 9, a speckle noise removing mechanism 10 and a main projection lens 11.

The multipurpose projector 200 has the same construction as the multipurpose projector 100 up to the reduction projection optical system 5. The main projection lens 11 enlarges and projects modulated laser beams to a display space 13 different from the display space 12, to which laser beams are projected via the fiber bundle 6, without guiding them to the fiber bundle 6. The switching element 9 is switched to split the modulated laser beams to the main projection lens 11 and to the fiber bundle 6 or guide the laser beams only to either one of them. The speckle noise removing mechanism 10 is arranged on an imaging plane of an image reduced and projected at the side of the main projection lens 11, i.e. at a position equivalent to an input plane of the fiber bundle 6, and temporally changes the phase of light.

The multipurpose projector 200 of the second embodiment includes the main projection lens 11 for enlarging and projecting the modulated light in addition to the projection lens 8 on the output plane of the fiber bundle 6. In the case of guiding and projecting laser beams to the fiber bundle 6, there is a problem that the quality of an image of the modulated laser beams is deteriorated depending on the number of the cores of the fiber bundle 6 and the shape of the cladding. In this embodiment, the modulated laser beams can be displayed with high image quality using the main projection lens 11 for the specific display space 13. Particularly, it is suitable in the case of displaying an image in a display space used as a main display in a room. By projecting the laser beams from the fiber bundle 6 simultaneously with the projection of the laser beams from the main projection lens 11, illumination, decoration and addition of various pieces of information can be simultaneously performed in the display space 12 and the main display (other display space 13).

The switching element 9 switches the modulated laser beams only to one of the main projection lens 11 and the fiber bundle 6 and splits them at a suitable ratio when the multipurpose projector 200 includes two types of projection means, i.e. the main projection lens 11 and the fiber bundle 6. For example, the switching element 9 is a movable mirror and is switched to transmit the modulated light toward the main projection lens 11 and reflect them toward the fiber bundle 6.

The multipurpose projector 200 of this embodiment includes an optical element for splitting or switching the modulated light to or between the main projection lens 11 and the fiber bundle 6. By splitting or switching the modulated light, the multipurpose projector 200 of this embodiment can freely provide an image in the display space by using either one of the main projection lens 11 and the fiber bundle 6 or simultaneously using both. At the time of projection only from either one of the main projection lens 11 and the fiber bundle 6, efficiently modulated laser beams can propagate toward the projection side.

The switching element 9 may be arranged between the spatial modulation element 3 and the fiber bundle 6 and incorporated into the reduction projection optical system 5 or may be arranged between the reduction projection optical system 5 and the spatial modulation element 3.

Particularly in the case of using a liquid crystal element for rotating a polarization direction as the spatial modulation element 3, a reflective polarizing element is preferably used as the switching element 9. In the second embodiment, a transmissive liquid crystal having no polarizing plate at an output side is used as the spatial modulation element 3 and a wire-grid type reflective polarizing element is used as the switching element 9. The reflective polarizing element splits or switches light to or between the main projection lens 11 and the fiber bundle 6 depending on the polarization direction determined by the spatial modulation element 3.

For example, the spatial modulation element 3 performs modulation by rotating the polarization direction toward the main projection lens 11 so as to obtain a specified image. Unnecessary light whose polarization direction is not rotated is guided to the fiber bundle 6. At this time, the unnecessary light from the fiber bundle 6 is used for illumination by setting the projection lens 8 in a defocus state. In this embodiment, the multipurpose projector 200 includes the spatial modulation element 3 for rotating the polarization direction and the reflective polarizing element for splitting laser beams, wherefore unnecessary light, which has not be conventionally utilized, can also be utilized.

A projection direction can also be switched by using the optical component or modulation element for rotating the polarization direction such as a wave plate and the reflective polarizing element for splitting laser beams. In this case, a split ratio can be freely changed according to an angle of rotation of the polarization direction. Further, a PBS (polarization beam splitter) can be used as the reflective polarizing element.

In this embodiment, the modulated light projected from the output plane of the fiber bundle 6 and that projected from the main projection lens 11 may be in a positive/negative relationship. Positive and negative refer to as images whose darkness is reversed. In other words, either ones of the modulated laser beams enlarged and projected from the projection lens 8 and those enlarged and projected from the main projection lens 11 may form a positive image, whereas the others may form a negative image.

By using the transmissive liquid crystal having no polarizing plate at the output side and the wire-grid type reflective polarizing element as in the second embodiment, the light modulated to have a positive/negative relationship is split to the fiber bundle 6 and the main projection lens 11 and projected. For example, the modulated laser beams enlarged and projected from the projection lens 8 form a negative image and those enlarged and projected from the main projection lens 11 form a positive image.

As described above, since either ones of the modulated laser beams enlarged and projected from the projection lens 8 and those enlarged and projected from the main projection lens 11 form a positive image and the others form a negative image, an image to be projected can be accentuated and interpolated. It is also possible to project both positive and negative images to different display spaces and decorate the display space to illuminate the display space with light inverted from the entire image by setting the projection lens 8 on the side of the fiber bundle 6 in the defocus state.

The speckle noise removing mechanism 10 at the side of the main projection lens 11 is arranged on an imaging plane of the modulated light. In the second embodiment, the speckle noise removing mechanism 10 is arranged on the imaging plane of the reduction projection optical system 5. The speckle noise removing mechanism 10 of the second embodiment temporally changes the phase by vibrating a holographic diffuser in an in-plane direction of the imaging plane. The speckle noise removing mechanism 10 temporally averages and removes speckle noise as laser coherence noise. Further, the speckle noise removing mechanism 10 can remove only the speckle noise while maintaining the image quality by being arranged on the imaging plane.

In this embodiment, the reduction projection optical system 5 forms the imaging plane on the input plane of the fiber bundle 6 and the imaging plane on an insertion surface of the speckle noise removing mechanism 10 at the side of the main projection lens 11. Further, since the imaging surface has a very small area in this embodiment, the speckle noise removing mechanism 10 can be miniaturized. The speckle noise removing mechanism 10 vibrates the holographic diffuser in the in-plane direction of the imaging plane by using a driver such as a piezoelectric element or an ultrasonic motor.

In this embodiment, the multipurpose projector 200 includes the main projection lens 11 for enlarging and projecting an imaging plane, which is reduced and projected, to the other display space without guiding it to the fiber bundle 6. By using the reduced and projected imaging plane, the main projection lens 11 can be miniaturized. Further, the main projection lens 11 and the projection lens 8 on the output plane of the fiber bundle 6 may have the same design.

(Third Embodiment)

Figure 4:
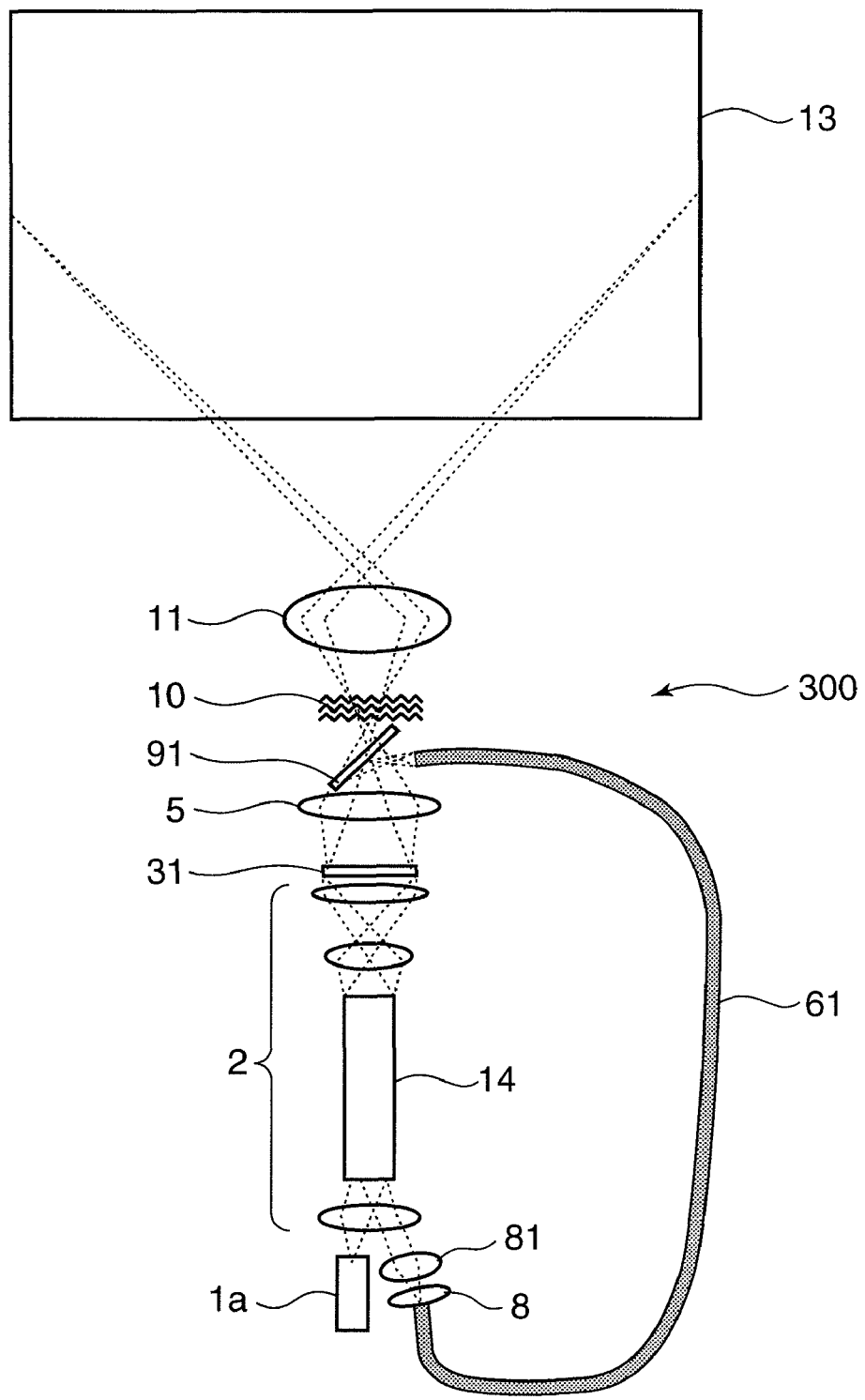
FIG. 4 is a schematic construction diagram of a multipurpose projector according to a third embodiment of the invention.

FIG. 4 is a schematic construction diagram of a multipurpose projector 300 according to a third embodiment of the present invention. In FIG. 4, the same construction as the first and second embodiments is identified by the same reference numerals and not described.

The multipurpose projector 300 shown in FIG. 4 is provided with a laser beam source 1a, an illumination optical system 2, a reduction projection optical system 5, a projection lens 8, a speckle noise removing mechanism 10, a main projection lens 11, a spatial modulation element 31, a fiber bundle 61, a coupling lens 81 and a reflective polarizing element 91. In the third embodiment, the illumination optical system 2, the reduction projection optical system 5 and the spatial modulation element 31 correspond to an example of the optical guide unit.

The laser beam source 1a is a unit of three laser beam sources of three red, green and blue colors and emits laser beams of different colors successively in the order of, e.g. red, green, blue, red, and so on. Laser beams emitted from the laser beam source 1a are shaped by the illumination optical system 2 to illuminate the spatial modulation element 31. The spatial modulation element 31 is composed of transmissive liquid crystal and modulates the beams of the respective colors in a time-sharing manner. The modulated laser beams are reduced and projected by the reduction projection optical system 5. The reduced and projected laser beams are split toward the fiber bundle 61 and the main projection lens 11 by the reflective polarizing element 91.

In the multipurpose projector 300, an output aperture of the fiber bundle 61 is connected to the illumination optical system 2 via the coupling lens 81 when an image is projected only from the main projection lens 11. Light guided from the reflective polarizing element 91 to the fiber bundle 61 is incident on the illumination optical system 2 via the projection lens 8 and the coupling lens 81 and mixed with light emitted from the laser beam source 1a by a rod integrator 14.

When an image is projected only from the main projection lens 11, light incident on the fiber bundle 61 is the one unnecessary for image formation, i.e. a negative image if an image from the main projection lens 11 is a positive image. Light is reutilized by re-coupling this unnecessary light to the illumination optical system 2. At this time, in this embodiment, the intensity of light emitted from the laser beam source 1a is modulated in accordance with an image signal input to the spatial modulation element 31 so that the peak luminance and white color of an image projected from the main projection lens 11 lie in fixed ranges.

In other words, the laser beam source 1a calculates the luminance of the image signal input to the spatial modulation element 31 for the entire screen and modulates the intensities of laser beams to be emitted according to the calculated entire luminance.

For example, if it is assumed that re-coupling efficiency from the fiber bundle 61 is 50% and the intensity of light emitted from the laser beam source 1a in the case of a maximum luminance, at which the entire screen is white is 1, the intensity of the light emitted from the laser beam source 1a is 0.75 if one half of the screen is white and the remaining half is black while being 0.63 if ¼ of the screen is white and the remainder is black.

In this way, an image, for which the intensity of light emitted from the laser beam source 1a conventionally needs to be 1, can be displayed with an output equal to or below 1. Further, in the case of a dark image whose peak luminance is low, the intensity of light emitted from the laser beam source 1a can be further suppressed by setting low intensity for the light emitted from the laser beam source 1a and controlling a modulation signal to increase the transmittance of the spatial modulation element 31.

In this embodiment, the output aperture of the fiber bundle 61 is connected to the illumination optical system 2, light output from the fiber bundle 61 is mixed with light for illuminating the spatial modulation element 31 and the light intensity of the laser beam source 1a is modulated in accordance with an image signal input to the spatial modulation element 31. In this embodiment, even if the light intensity of the laser beam source 1a is set low, power saving attributable to the use of the fiber bundle 61 is possible by displaying an image in the fixed range of the peak luminance and in a fixed color range.

(Fourth Embodiment)

Figure 5:
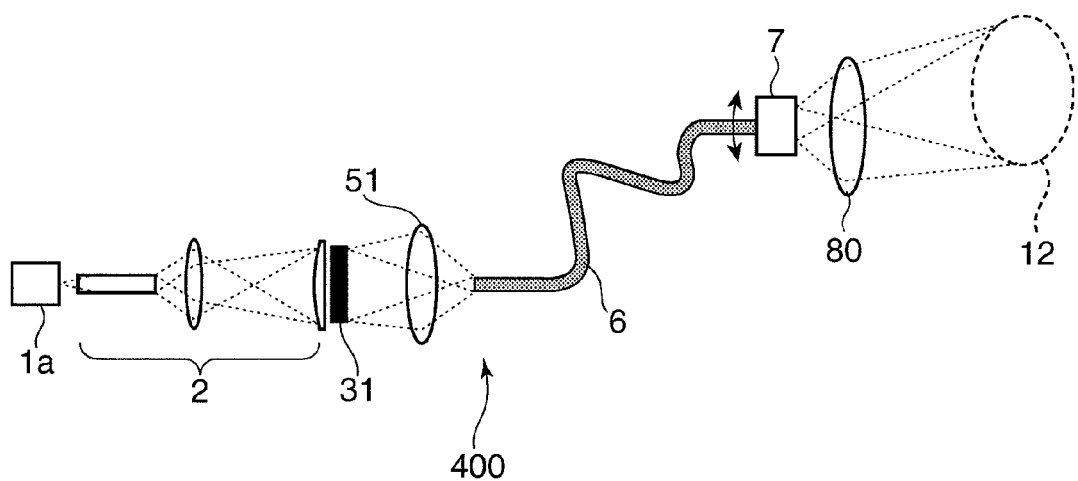
FIG. 5 is a schematic construction diagram of a multipurpose projector according to a fourth embodiment of the invention.

FIG. 5 is a schematic construction diagram of a multipurpose projector 400 according to a fourth embodiment of the present invention. In FIG. 5, the same construction as the first to third embodiments is identified by the same reference numerals and not described.

The multipurpose projector 400 shown in FIG. 5 is provided with a laser beam source 1a, an illumination optical system 2, a fiber bundle 6, a projection angle adjusting mechanism 7, a spatial modulation element 31, a condensing optical system 51 and a projection lens 80. In the fourth embodiment, the illumination optical system 2, the spatial modulation element 31 and the condensing optical system 51 correspond to an example of the optical guide unit.

Laser beams emitted from the laser beam source 1a are shaped by the illumination optical system 2 to illuminate the spatial modulation element 31. The laser beams emerging from the spatial modulation element 31 are condensed on an input plane of the fiber bundle 6 by the condensing optical system 51. At this time, the condensing optical system 51 does not form an image on the input plane of the fiber bundle 6, and a focus of the condensing optical system 51 is located near the input plane of the fiber bundle 6. The projection lens 80 is mounted near an output plane of the fiber bundle 6 for enlarging and forming an image of the modulated laser beams in a display space 12.

In this embodiment, an image is projected to the display space 12 without missing a part of modulation information even if the fiber bundle 6 is defective. In the case of projecting an image using the fiber bundle 6, there is a problem of missing a part of the image if some of the cores are defective. However, in this embodiment, a Fourier transform pattern of a modulation signal is transmitted by the fiber bundle 6 without forming an image on the input plane of the fiber bundle 6, and an image is formed in the display space 12 by the projection lens 80. Thus, even if some of the cores are defective, modulation information of a fixed frequency or lower can be displayed in the display space 12 without missing an image at a specific position.

(Fifth Embodiment)

Figure 6:
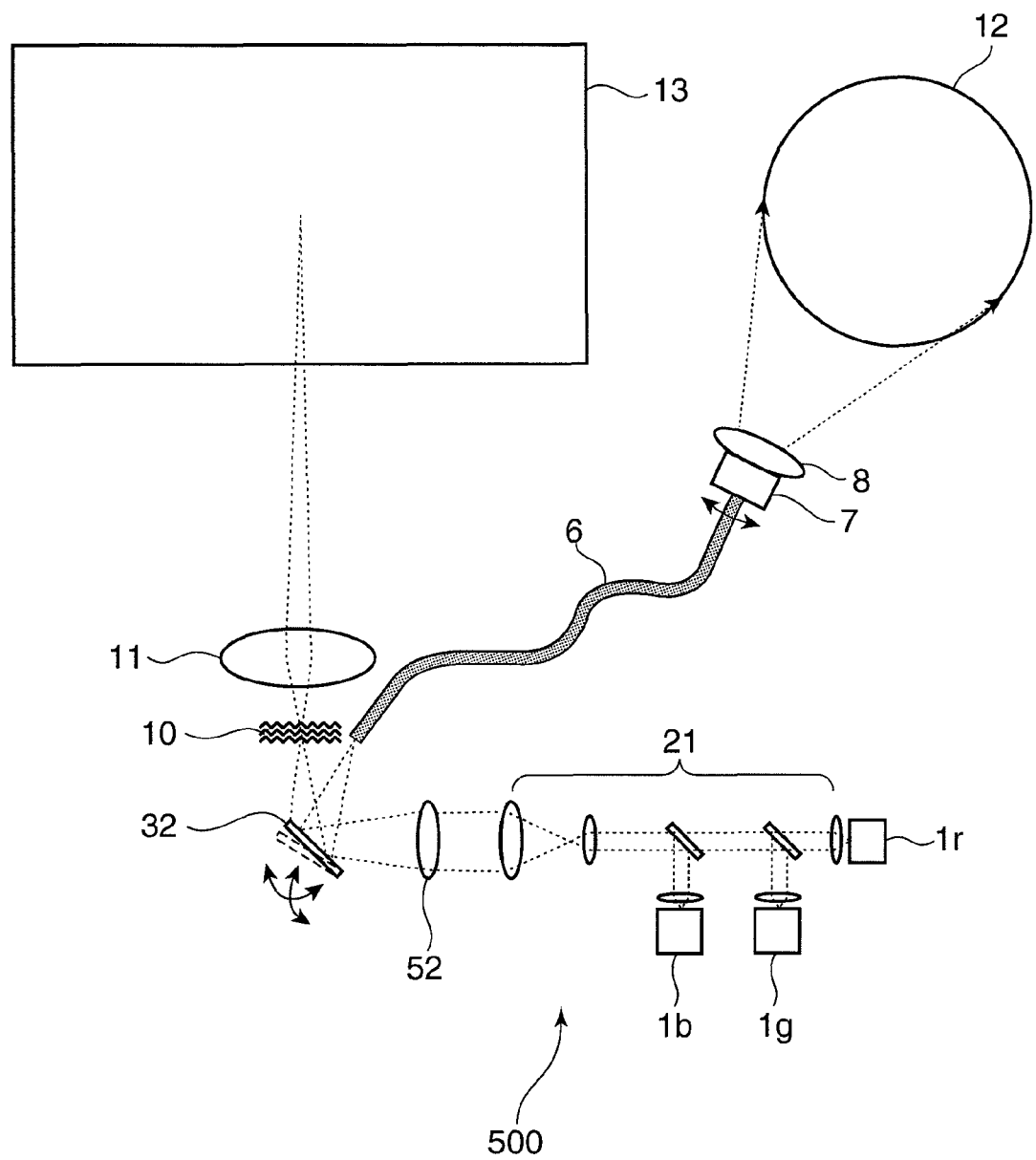
FIG. 6 is a schematic construction diagram of a multipurpose projector according to a fifth embodiment of the invention.

FIG. 6 is a schematic construction diagram of a multipurpose projector 500 according to a fifth embodiment of the present invention. In FIG. 6, the same construction as the first to fourth embodiments is identified by the same reference numerals and not described.

The multipurpose projector 500 shown in FIG. 6 is provided with laser beam sources 1r, 1g and 1b, a fiber bundle 6, a projection angle adjusting mechanism 7, a projection lens 8, a speckle noise removing mechanism 10, a main projection lens 11, an illumination optical system 21, a scan mirror 32 and a condenser lens 52. In the fifth embodiment, the illumination optical system 21, the scan mirror 32 and the condenser lens 52 correspond to an example of the optical guide unit.

Laser beams of the respective red, green and blue colors emitted from the laser beam sources 1r, 1g and 1b have the axes thereof aligned by the illumination optical system 21 and are shaped. The illumination optical system 21 includes a collimator lens, a dichroic mirror and a beam expander. The laser beam sources 1r, 1g and 1b modulate output intensities in accordance with an image signal. The condenser lens 52 narrows the laser beams so that the laser beams are gathered on an input plane of the fiber bundle 6.

The scan mirror 32 two-dimensionally scans the beams and performs spatial modulation to the laser beams in accordance with intensity modulations of the laser beam sources 1r, 1g and 1b. The scan mirror 32 two-dimensionally scans the laser beams by operating along two axes. The spatially modulated laser beams are focused on the input plane of the fiber bundle 6 by the condenser lens 52, and this image is transmitted to an output plane of the fiber bundle 6. Similar to the first embodiment, the projection angle adjusting mechanism 7 and the projection lens 8 are mounted on the fiber bundle 6 and the spatially modulated laser beams are enlarged and projected to an arbitrary display space 12. The projection angle adjusting mechanism 7 repeatedly vibrates the projection lens 8 during the projection of the laser beams to remove speckle noise.

In this embodiment, the laser beams are spatially modulated by the intensity modulations of the laser beam sources 1r, 1g and 1b and the two-dimensional scanning of the scan mirror 32 and the scanned laser beams are condensed on the input plane of the fiber bundle 6 by the condenser lens 52, thereby forming an imaging plane of the spatially modulated light on the input plane of the fiber bundle 6. Since only the imaging plane is formed on the input plane of the fiber bundle 6 having a very small area without using a spatial modulation element, the optical system can be miniaturized and simplified, which enables the miniaturization and cost reduction of the apparatus.

It is sufficient for the condenser lens 52 to have a function of condensing beams on the input plane of the fiber bundle 6, and the condenser lens 52 may be incorporated into the illumination optical system 21 or arranged between the scan mirror 32 and the fiber bundle 6.

It is sufficient for the scan minor 32 to perform two-axis scanning, and the scan minor 32 may be comprised of two minors. Not only a reflective minor, but also a diffractive or refractive mirror may be used as the scan minor 32 to perform two-axis scanning.

The multipurpose projector 500 can also form an imaging plane of spatially modulated light except on the input plane of the fiber bundle 6 by changing a scanning angle of the scan minor 32 and enlarges and projects an image to another display space 13 via the main projection lens 11 without guiding light to the fiber bundle 6. The speckle noise removing mechanism 10 is arranged on an imaging plane at the side of the main projection lens 11 and removes speckle noise by temporally changing the phases of the laser beams.

The multipurpose projector 500 can switch a projection pattern of projecting only from the fiber bundle 6, a projection pattern of projecting only from the main projection lens 11 and a projection pattern of projecting from both the fiber bundle 6 and main projection lens 11 by switching the scanning angle of the scan minor 32 and an intensity modulation pattern of the laser beam sources 1r, 1g and 1b. In order to switch the scanning angle of the scan mirror 32, a switching mirror or the like may be separately provided.

In this embodiment, the imaging plane of spatially modulated light is formed other than on the input plane of the fiber bundle by adjusting the scanning angle of the scan mirror 32 and an image on the formed imaging plane is enlarged and projected to another display space 13 by the main projection lens 11 without being guided to the fiber bundle 6. In the case of guiding laser beams to the fiber bundle 6 and projecting them from the fiber bundle 6, there is a problem that the quality of an image of the modulated laser beams is deteriorated depending on the number of the cores of the fiber bundle 6 and the shape of the cladding. In this embodiment, modulated laser beams can be displayed in a specific display space 13 with high image quality using the main projection lens 11. This embodiment is particularly suitable in the case of displaying an image in a display space used as a main display in a room. By projecting the laser beams from the fiber bundle 6 simultaneously with the projection of the laser beams from the main projection lens 11, illumination, decoration and addition of various pieces of information can be simultaneously performed in the display space 12 and the main display (other display space 13). Since the imaging plane having a very small area formed by the condenser lens 52 is used, it is possible to miniaturize the main projection lens 11 and the speckle noise removing mechanism 10.

(Sixth Embodiment)

FIGS. 7A and 7B are schematic construction diagrams of a multipurpose projector 600 according to a sixth embodiment. FIG. 7A shows a schematic construction of the multipurpose projector 600 in the case of guiding laser beams to a fiber bundle and a main projection lens and FIG. 7B shows a schematic construction of the multipurpose projector 600 in the case guiding laser beams only to the fiber bundle. FIGS. 7A and 7B, the same construction as the first to fifth embodiments is identified by the same reference numerals and not described.

Figure 8A:
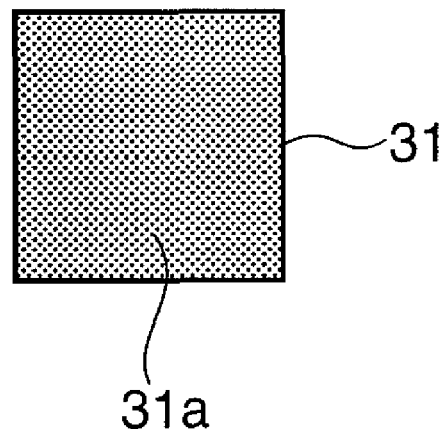
FIGS. 8A and 8B are diagrams showing illumination regions of a spatial modulation element of the multipurpose projector shown in FIGS. 7A and 7B.
Figure 8B:
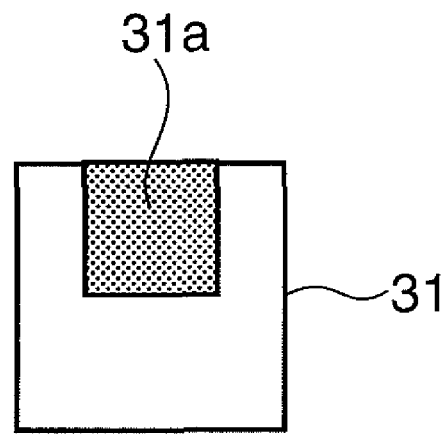

FIG. 8A is a diagram showing an illumination region of a spatial modulation element of the multipurpose projector 600 shown in FIG. 7A, and FIG. 8B is a diagram showing an illumination region of the spatial modulation element of the multipurpose projector 600 shown in FIG. 7B.

The multipurpose projector 600 shown in FIGS. 7A and 7B is provided with a laser beam source 1a, a reduction projection optical system 5, a projection angle adjusting mechanism 7, a projection lens 8, a main projection lens 11, an illumination optical system 22, a relay lens 23, a relay lens driver 24, a spatial modulation element 31 and a fiber bundle 62. In this embodiment, the relay lens 23 and the relay lens driver 24 correspond to an example of an illumination area reducing unit, and the reduction projection optical system 5, the illumination optical system 22 and the spatial modulation element 31 correspond to an example of the optical guide unit.

A laser beam emitted from the laser beam source 1a is shaped by the illumination optical system 22 including the relay lens 23 to illuminate the spatial modulation element 31. The spatial modulation element 31 modulates the incident laser beam. In the case of guiding light to both the main projection lens 11 and the fiber bundle 62, the entire area of the spatial modulation element 31 is illuminated as shown in FIG. 7A. In other words, as shown in FIG. 8A, an illumination area 31a illuminated by the illumination optical system 22 spreads over the entire surface of the spatial modulation element 31. At this time, the relay lens driver 24 conforms an optical axis of the laser beam to the substantially center of the relay lens 23 without moving the relay lens 23.

The laser beam modulated by the spatial modulation element 31 is projected to an input plane of the fiber bundle 62 and an imaging plane at the side of the main projection lens 11 by the reduction projection optical system 5. The laser beam incident on the fiber bundle 62 is projected to a display space 12 via the projection lens 8. An image formed at the side of the main projection lens 11 is projected to another display space 13 by the main projection lens 11.

On the other hand, in the case of guiding light only to the fiber bundle 62, the illumination area of the spatial modulation element 31 is reduced in size as shown in FIG. 7B. In FIG. 7B, the relay lens driver 24 shifts the relay lens 23 upward and in an optical axis direction. Thus, the illumination area 31a is reduced to be present only in an upper part of the spatial modulation element 31 as shown in FIG. 8B. The upper part of the spatial modulation element 31 corresponds to the input plane of the fiber bundle 62, and illumination is centered on an area where light is guided to the fiber bundle 62 to reduce the illumination area 31a in size.

In this case, the laser beam modulated by the spatial modulation element 31 is projected only to the input plane of the fiber bundle 62 by the reduction projection optical system 5. The laser beam incident on the fiber bundle 62 is projected to the display space 12 via the projection lens 8.

Similarly, also in the case of guiding light only to the main projection lens 11, the relay lens 23 may be shifted to reduce the size of the illumination area 31a of the spatial modulation element 31 as compared with the case where light is guided to both the fiber bundle 62 and the main projection lens 11.

In this embodiment, the illumination area of the spatial modulation element 31 is reduced in size in the case of guiding light only to the input plane of the fiber bundle 62. If no switching element is present although the main projection lens 11 is required, there is a problem of increasing a light quantity loss if only the fiber bundle 62 is used. However, in this embodiment, the light quantity loss can be reduced by controlling the position of the illumination area of the spatial modulation element 31 in accordance with how the multipurpose projector is used.

(Seventh Embodiment)

Figure 9:
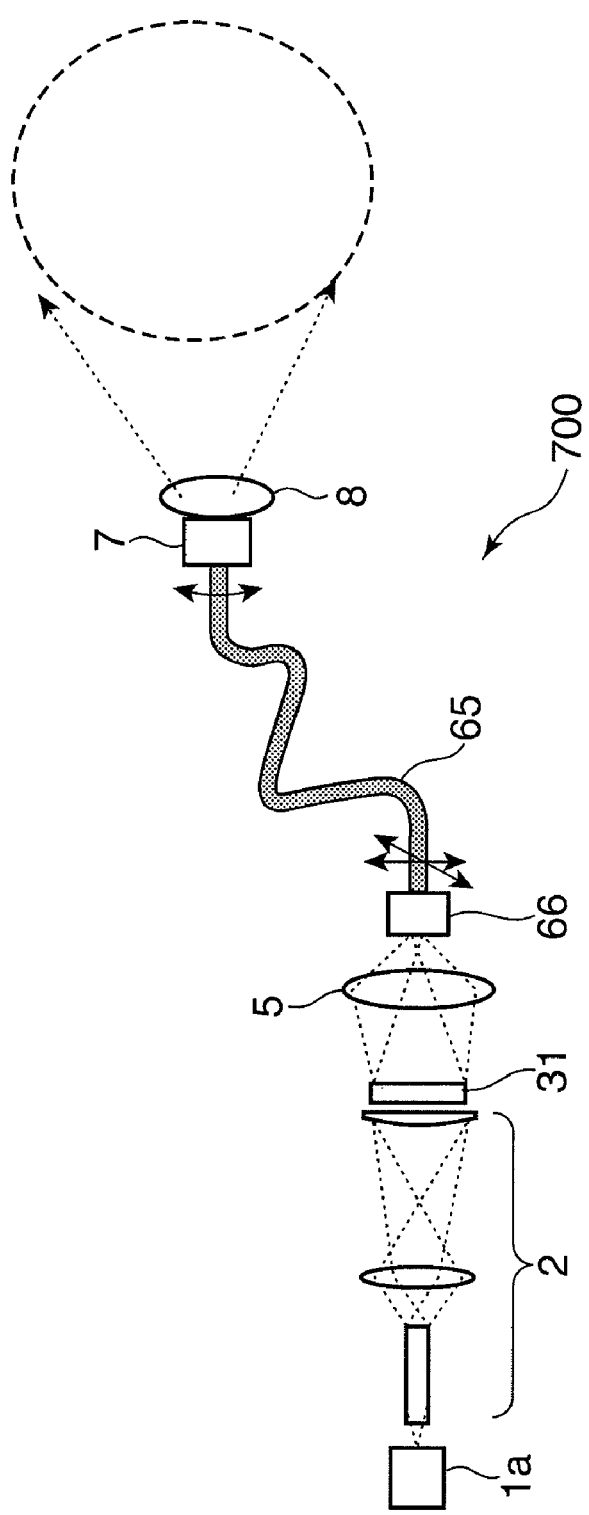
FIG. 9 is a schematic construction diagram of a fiber bundle according to a seventh embodiment of the invention.

FIG. 9 is a schematic construction diagram of a multipurpose projector 700 according to a seventh embodiment of the present invention. In FIG. 9, the same construction as the first to sixth embodiments is identified by the same reference numerals and not described.

The multipurpose projector 700 shown in FIG. 9 is provided with a laser beam source 1a, an illumination optical system 2, a projection angle adjusting mechanism 7, a projection lens 8, a spatial modulation element 31, a fiber bundle 65 and an input plane vibrating mechanism 66.

The input plane vibrating mechanism 66 is arranged on an input plane of the fiber bundle 65 to vibrate the input plane in an in-plane direction. The input plane vibrating mechanism 66 vibrates the input plane of the fiber bundle 65 in the in-plane direction to temporally displace cores for guiding light when a modulated laser beam is incident on the fiber bundle 65. Speckle noise as coherence noise of the laser beam can be temporally averaged and removed by temporally displacing the cores for guiding the laser beam to differ the cores. Further, by displacing the cores for guiding light, an image with no defect can be projected even if some of the cores are defective.

Simultaneously, a displacement of an image caused by the vibration of the input plane by the input plane vibrating mechanism 66 may be compensated for by finely vibrating the output plane of the fiber bundle 65 by the projection angle adjusting mechanism 7. In this case, speckle noise can be removed while good image quality is maintained.

(Eighth Embodiment)

FIGS. 10A to 10D are diagrams showing an operation of changing the orientation of an image to be projected in a multipurpose projector 800 according to an eighth embodiment of the present invention.

Figure 10A:
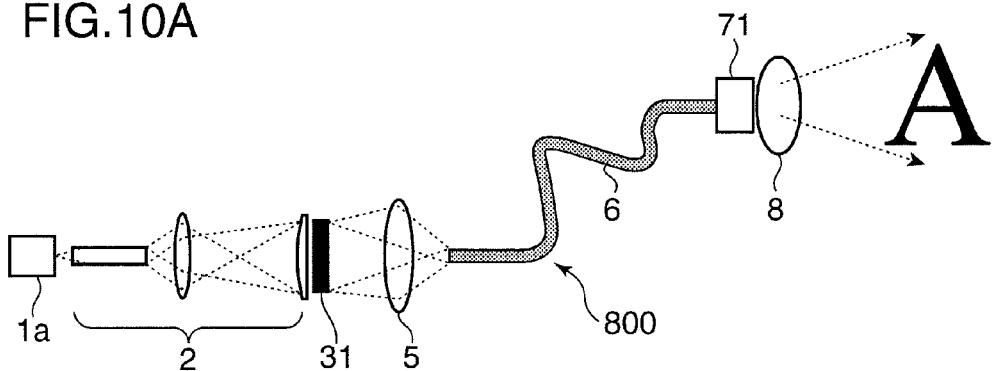
FIGS. 10A to 10D are diagrams showing an operation of changing the orientation of an image to be projected in a multipurpose projector according to an eighth embodiment of the invention.
Figure 10B:
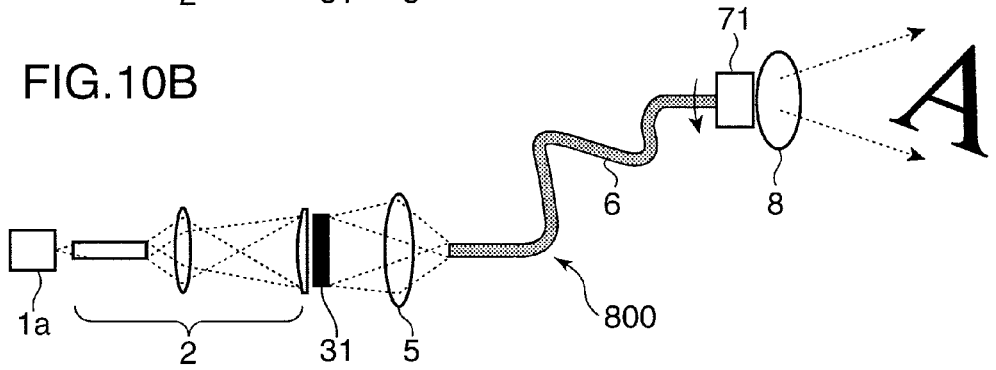
Figure 10C:
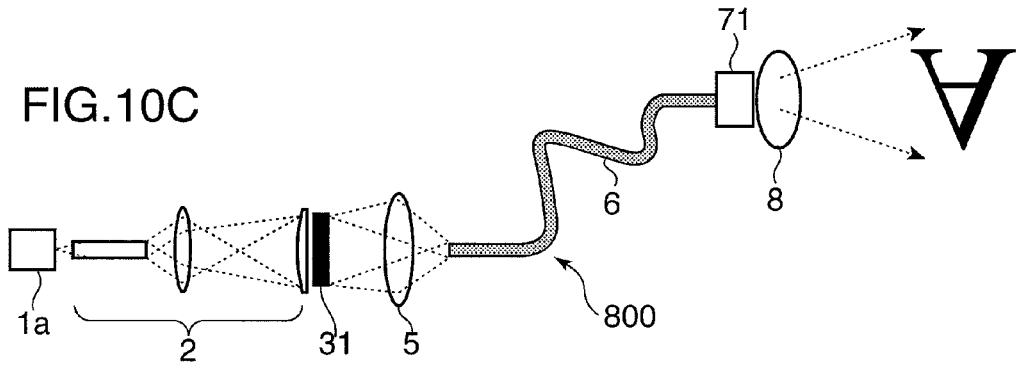
Figure 10D:
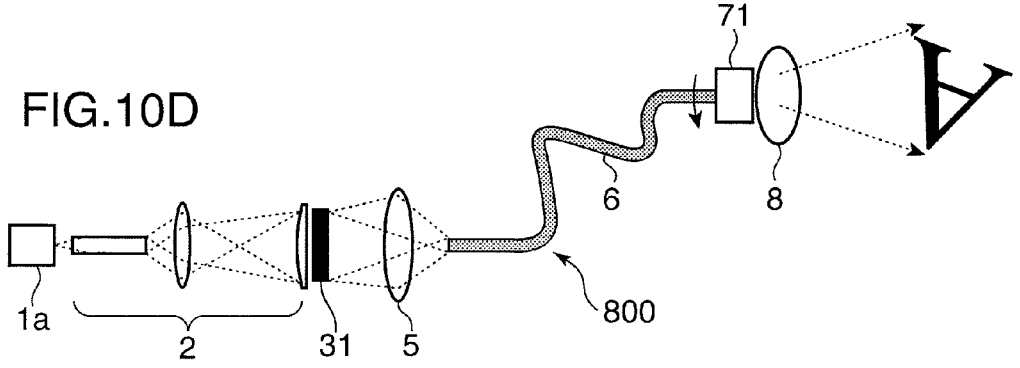

FIG. 10A is a schematic construction diagram of the multipurpose projector 800 according to the eighth embodiment of the present invention, FIG. 10B is a diagram showing an operation of rotating an image to be projected by an angle below 90°, FIG. 10C is a diagram showing an operation of rotating an image to be projected by an angle of 180° and FIG. 10D is a diagram showing an operation of rotating an image to be projected by an angle equal to or larger than 90° and below 180°. In FIGS. 10A to 10D, the same construction as the first to seventh embodiments is identified by the same reference numerals and not described.

There is described an operation of changing the orientation of the image from that shown in FIG. 10A to those shown in FIGS. 10B to 10D when the image is projected from a projection lens 8 provided on an output plane of a fiber bundle 6 in the multipurpose projector 800.

A projection angle adjusting mechanism 71 also adjusts an angle of the fiber bundle 6 in a direction of axial rotation. As shown in FIG. 10B, the projection angle adjusting mechanism 71 axially rotates the fiber bundle 6 in the case of rotating the image by an angle below 90°. Further, as shown in FIG. 10C, a spatial modulation element 31 switches the image to a modulation pattern rotated by 180° without using the projection angle adjusting mechanism 71 in the case of rotating the image by an angle of 180°. Furthermore, as shown in FIG. 10D, the spatial modulation element 31 switches a modulation pattern of a laser beam and the projection angle adjusting mechanism 71 axially rotates the fiber bundle 6 in the case of rotating the image by an angle equal to or larger than 90° and below 180°.

Although the image is rotated rightward by the angle below 90° in FIG. 10B, the fiber bundle 6 is axially rotated by the projection angle adjusting mechanism 71 also in the case of rotating the image leftward by an angle below 90°. Although the image is rotated leftward by the angle equal to or larger than 90° and below 180° in FIG. 10D, the modulation pattern of the laser beam is switched by the spatial modulation element 31 and the fiber bundle 6 is axially rotated by the projection angle adjusting mechanism 71 also in the case of rotating the image rightward by an angle equal to or larger than 90° and below 180°.

In the multipurpose projector 800 of this embodiment, the orientation of an image to be projected can be freely adjusted by axially rotating the fiber bundle 6. Further, in the case of axially rotating the fiber bundle 6 by an angle equal to or larger than 90°, a large stress may possibly act on the fiber bundle 6 to cause problems of enlarging a driving mechanism and fracturing the fiber. However, in this embodiment, these problems are solved by combining the axial rotation of the fiber bundle 6 by the projection angle adjusting mechanism 71 and the switching of the modulation pattern of the laser beam by the spatial modulation element 31, wherefore the orientation of the image can be freely adjusted without exerting a large stress to the fiber bundle 6.

(Ninth Embodiment)

Figure 11:
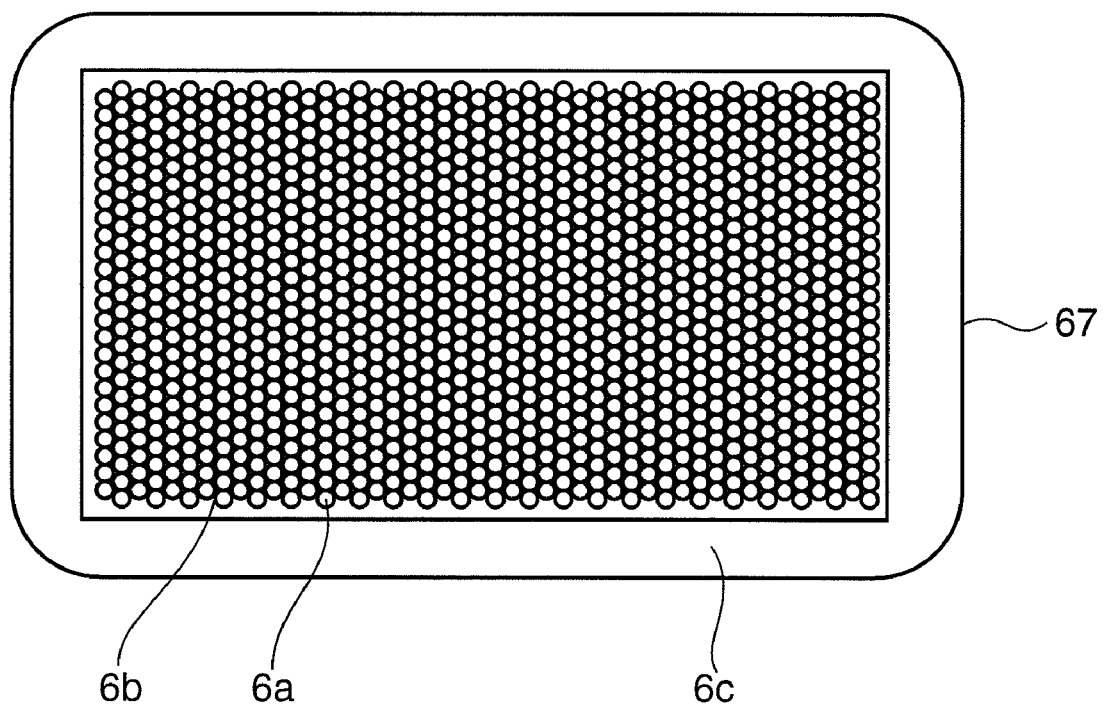
FIG. 11 is a schematic section showing an input/output plane of a fiber bundle according to a ninth embodiment of the invention.

FIG. 11 is a section of an input/output plane of a fiber bundle 67 according to a ninth embodiment of the present invention. In the fiber bundle 67, the aggregated shape of cores 6a for guiding light is rectangular in the input and output planes. Since a projector using a fiber bundle frequently uses rectangular images whose aspect ratios are 16:9 or 4:3, the fiber bundle preferably has a rectangular shape instead of a conventional round shape. In this embodiment, the aggregated shape of the cores is a rectangular shape with an aspect ratio of 16:9 or 4:3.

A projector using the fiber bundle 67 of this embodiment has a projection angle adjusting mechanism and requires a reference direction for an operation of adjusting an angle of an output plane. In this embodiment, the fiber bundle 67 has a rectangular cross-sectional shape. Thus, references in two axes for the projection angle can be determined and an operation space can be easily moved.

The fiber bundle 67 of the ninth embodiment is applicable to the fiber bundles of the multipurpose projectors according to the first to eighth embodiments.

(Tenth Embodiment)

Figure 12:
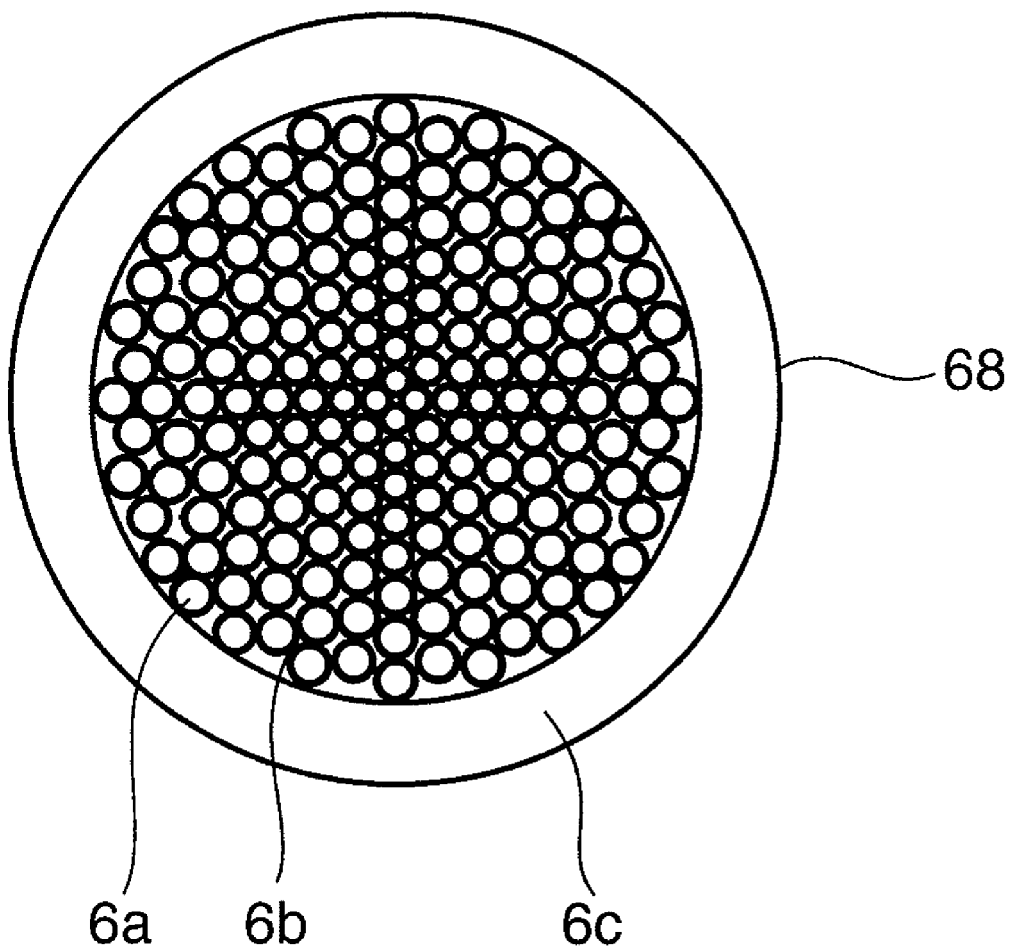
FIG. 12 is a schematic section showing an input/output plane of a fiber bundle according to a tenth embodiment of the invention.

FIG. 12 is a section of an input/output plane of a fiber bundle 68 according to a tenth embodiment of the present invention. Core diameters of the fiber bundle 68 differ in a central part and an outer peripheral part of the fiber bundle 68, wherein the core diameters in the outer peripheral part of the fiber bundle 68 are larger than those in the central part.

An image projected using a fiber bundle has a problem that a peripheral part of the image becomes darker due to the eclipse of light when being incident on and emerging from the fiber bundle. In this embodiment, an area ratio of the cores is increased to increase light utilization efficiency and the darkening of the peripheral part of the image is prevented by setting the core diameters in the outer peripheral part of the fiber bundle where light is easily eclipsed larger than those in the central part. Further, in this embodiment, a resolution of the central part of the image with a higher degree of attention can be increased as against that in the peripheral part by setting the core diameters in the central part of the fiber bundle smaller than those in the outer peripheral part. This embodiment is particularly suitable when a main part of information wished to be provided is present in a central part of an image.

The fiber bundle 68 of the tenth embodiment can be applied as the fiber bundles of the multipurpose projectors according to the first to eighth embodiments.

In the above first to tenth embodiments, a method combining a spatial modulation element and a scan mirror may be used as a method for modulating a laser beam. Further, the wavelength and shape of laser beams emitted from the laser beam source(s) are not particularly limited to those of the above first to tenth embodiments. A laser beams source having an array structure such as a multi-stripe structure or an external resonator type laser beam source may be used. The illumination optical system is also not particularly limited to those of the above first to tenth embodiments, and it is sufficient to obtain a beam shape necessary for laser beam modulation.

The above specific embodiments mainly embrace inventions having the following constructions.

A projector according to one aspect of the present invention comprises a fiber bundle including a plurality of cores fixedly arranged on an input plane and an output plane; a laser beam source for emitting a laser beam having a directivity; an optical guide unit for modulating the laser beam emitted from the laser beam source and guiding the modulated laser beam to the input plane of the fiber bundle; a projection lens for enlarging and projecting the laser beam emerging from the output plane of the fiber bundle to a display space; and a projection angle adjusting mechanism disposed on the side of the output plane of the fiber bundle for adjusting a projection angle of the laser beam projected from the projection lens.

According to this construction, the fiber bundle includes the plurality of cores fixedly arranged on the input plane and the output plane. A laser beam having a directivity is emitted from the laser beam source, and the laser beam emitted from the laser beam source is modulated and the modulated laser beam is guided to the input plane of the fiber bundle by the optical guide unit. The laser beam emerging from the output plane of the fiber bundle is enlarged and projected to the display space by the projection lens. The projection angle of the laser beam projected from the projection lens is adjusted by the projection angle adjusting mechanism disposed on the side of the output plane of the fiber bundle.

Since the projection angle of the laser beam projected from the projection lens is adjusted, the projector can have its projection space freely operated and enlarged to extend its application not only to image display, but also to illumination and decoration with colored light.

In the above projector, it is preferable to further comprise a main projection lens for enlarging and projecting the laser beam modulated by the optical guide unit to another display space without guiding it to the fiber bundle.

According to this construction, the laser beam modulated by the optical guide unit is enlarged and projected to the other display space by the main projection lens without being guided to the fiber bundle. Thus, it is possible to illuminate and decorate the display space via the projection lens, add various pieces of information to the display space and display an image in the other display space via the main projection lens.

In the above projector, it is preferable to further comprise an optical element for splitting or switching the laser beam modulated by the optical guide unit to or between the main projection lens and the fiber bundle.

According to this construction, since the laser beam modulated by the optical guide unit is split to or switched between the main projection lens and the fiber bundle by the optical element, an image can be freely formed in the display space.

In the above projector, it is preferable that the optical element includes a reflective polarizing element, that the optical guide unit includes a modulation element or an optical component for rotating a polarization direction of the modulated laser beam, and that the reflective polarizing element splits or switches the laser beam according to the polarization direction of the modulated laser beam. According to this construction, a split ratio can be freely changed according to a rotation angle of the polarization direction of the modulated laser beam.

In the above projector, the cores of the fiber bundle are preferably non-periodically arranged. According to this construction, moire in a projected image can be prevented since the cores of the fiber bundle are non-periodically arranged.

In the above projector, the number of the cores of the fiber bundle is preferably smaller than the number of pixels of a spatially modulated image.

According to this construction, since the number of the cores of the fiber bundle is smaller than the number of the pixels of the spatially modulated image, moire in a projected image can be prevented and a laser beam can be projected by retaining incident angle distribution information on the cores to compensate for a reduction of pixel information at the time of modulation.

In the above projector, core diameters of the fiber bundle are preferably larger in an outer peripheral part than in a central part of the fiber bundle.

According to this construction, darkening of a peripheral part of an image can be prevented by increasing an area ratio of the cores in the outer peripheral part of the fiber bundle where light is easily eclipsed and increasing light utilization efficiency since the core diameters of the fiber bundle is larger in the outer peripheral part than in the central part of the fiber bundle. Further, a resolution of a central part of an image with a higher degree of attention can be increased as against that in a peripheral part.

In the above projector, the optical guide unit preferably includes a spatial modulation element for modulating the laser beam emitted from the laser beam source and a reduction projection optical system for reducing and projecting the laser beam modulated by the spatial modulation element to the input plane of the fiber bundle.

According to this construction, a high-quality image in focus can be transmitted since an image of the spatial modulation element is focused on the input plane of the fiber bundle.

In the above projector, it is preferable to further comprise a main projection lens for enlarging and projecting the laser beam reduced and projected by the reduction projection optical system to another display space without guiding it to the fiber bundle.

According to this construction, the laser beam reduced and projected by the reduction projection optical system is enlarged and projected to the other display space by the main projection lens without being guided to the fiber bundle. Thus, it is possible to illuminate and decorate the display space via the projection lens, add various pieces of information to the display space and display an image in the other display space via the main projection lens.

In the above projector, the optical guide unit preferably includes a spatial modulation element for modulating the laser beam emitted from the laser beam source and, in the case of guiding the laser beam only to the input plane of the fiber bundle, an illumination area reducing unit for reducing an illumination area of the spatial modulation element.

According to this construction, the illumination area of the spatial modulation element is reduced by the illumination area reducing unit in the case of guiding the laser beam only to the input plane of the fiber bundle. In other words, in the case of guiding the laser beam only to the input plane of the fiber bundle without reducing the illumination area of the spatial modulation element, more light passing through the spatial modulation element is lost without being incident on the fiber bundle. However, a light quantity loss can be reduced since only the light having passed through the reduced illumination area of the spatial modulation element is incident on the fiber bundle by reducing the illumination area of the spatial modulation element.

In the above projector, it is preferable that the laser beam source modulates the light intensity of the laser beam, and that the optical guide unit further includes a scanning mirror for scanning and spatially modulating the laser beam and a condenser lens for condensing the laser beam scanned by the scanning mirror on the input plane of the fiber bundle.

According to this construction, the light intensity of the laser beam is modulated by the laser beam source, the laser beam is scanned by the scanning mirror and the laser beam being scanned is condensed on the input plane of the fiber bundle by the condenser lens.

Thus, the laser beam is condensed on the input plane of the fiber bundle without using a spatial modulation element, wherefore the optical system can be miniaturized and simplified, which enables the miniaturization and cost reduction of the apparatus.

In the above projector, it is preferable that a main projection lens for enlarging and projecting the modulated laser beam to another display space without guiding it to the fiber bundle is further provided, and that the scanning mirror scans an imaging plane of the laser beam to the fiber bundle and the main projection lens.

According to this construction, the modulated laser beam is enlarged and projected to the other display space by the main projection lens without being guided to the fiber bundle, and the imaging plane of the laser beam is scanned to the fiber bundle and the main projection lens by the scanning mirror. Thus, it is possible to illuminate and decorate the display space via the projection lens, add various pieces of information to the display space and display an image in the other display space via the main projection lens.

In the above projector, it is preferable to further comprise a speckle noise removing mechanism for temporally changing the phase of the laser beam enlarged and projected by the main projection lens. According to this construction, speckle noise can be removed by temporally changing the phase of the laser beam enlarged and projected by the main projection lens.

In the above projector, it is preferable that the optical guide unit includes a spatial modulation element for modulating the laser beam emitted from the laser beam source and a condensing optical system for condensing the laser beam modulated by the spatial modulation element on the input plane of the fiber bundle without focusing it on the input plane of the fiber bundle, and that the projection lens enlarges and focuses the laser beam emerging from the output plane of the fiber bundle.

According to this construction, the laser beam emitted from the laser beam source is modulated by the spatial modulation element, and the laser beam modulated by the spatial modulation element is condensed on the input plane of the fiber bundle by the condensing optical system without being focused on the input plane of the fiber bundle and the laser beam emerging from the output plane of the fiber bundle is enlarged and focused by the projection lens. Thus, the modulated laser beam is not focused on the input plane of the fiber bundle, wherefore an image at a specific position is not missed and modulation information of a fixed frequency or lower can be displayed in the display space even if some of the cores are defective.

In the above projector, it is preferable that the projection angle adjusting mechanism repeatedly vibrates the projection lens during a period of projecting the laser beam from the projection lens, and that the projection angle of the laser beam projected from the projection lens is adjusted during a movement of the display space.

According to this construction, the projection lens is repeatedly vibrated during the period of projecting the laser beam from the projection lens, and the projection angle of the laser beam projected from the projection lens is adjusted during the movement of the display space. Thus, speckle noise can be removed by being temporally averaged.

In the above projector, it is preferable to further comprise an input plane vibrating mechanism for temporally vibrating the input plane of the fiber bundle in an in-plane direction. According to this construction, speckle noise can be removed by being temporally averaged since the input plane of the fiber bundle is temporally vibrated in the in-plane direction.

In the above projector, the input and output planes of the fiber bundle preferably have rectangular shapes. According to this construction, references in two axes for the projection angle can be determined and the display space can be easily moved since the input and output planes of the fiber bundle have the rectangular shapes.

In the above projector, it is preferable that either one of the modulated laser beam enlarged and projected by the projection lens and that enlarged and modulated by the main projection lens is a positive image and the other is a negative image.

According to this construction, an image to be projected can be accentuated and interpolated since either one of the modulated laser beam enlarged and projected by the projection lens and that enlarged and modulated by the main projection lens is a positive image and the other is a negative image. It is also possible to project both positive and negative images to different display spaces and decorate the display space to illuminate the display space with light inverted from the entire image by setting the projection lens on the side of the fiber bundle in a defocus state.

In the above projector, it is preferable that a coupling lens for coupling a laser beam emitted from the projection lens and a laser beam emitted from the laser beam source is further provided, and that the laser beam source modulates the light intensity of the laser beam to be emitted in accordance with an image signal input to the spatial modulation element.

According to this construction, the laser beam emitted from the projection lens and the laser beam emitted from the laser beam source are coupled by the coupling lens, and the light intensity of the laser beam to be emitted is modulated in accordance with the image signal input to the spatial modulation element by the laser beam source. Thus, even if the intensity of the laser beam is reduced, an image can be displayed in a fixed range of peak luminance and in a fixed color range and power saving can be realized.

In the above projector, it is preferable that the optical guide unit includes a spatial modulation element for modulating the laser beam emitted from the laser beam source, that the spatial modulation element switches a direction of a modulation pattern in the case of rotating the orientation of an image enlarged and projected from the projection lens by 180°, the projection angle adjusting mechanism axially rotates the projection lens in the case of rotating the orientation of the image enlarged and projected from the projection lens by an angle below 90°, and that the spatial modulation element switches the direction of the modulation pattern and the projection angle adjusting mechanism axially rotates the projection lens in the case of rotating the orientation of the image enlarged and projected from the projection lens by an angle equal to or larger than 90° and below 180°.

According to this construction, the direction of the modulation pattern is switched in the case of rotating the orientation of the image enlarged and projected from the projection lens by 180°, and the projection lens is axially rotated in the case of rotating the orientation of the image enlarged and projected from the projection lens by an angle below 90°. Further, the direction of the modulation pattern is switched and the projection lens is axially rotated in the case of rotating the orientation of the image enlarged and projected from the projection lens by an angle equal to or larger than 90° and below 180°. Accordingly, the orientation of the image can be freely adjusted without exerting a large stress to the fiber bundle in the case of polarizing the orientation of an image enlarged and projected from the projection lens.

In the above projector, it is preferable that the optical guide unit includes a spatial modulation element for modulating the laser beam emitted from the laser beam source, and that a screen size $S_s$ of the spatial modulation element, a laser beam emission numerical aperture $NA_s$ of the spatial modulation element, a cross-sectional area $S_F$ of the fiber bundle and a numerical aperture $NA_F$ of the fiber bundle satisfy the following equations (4) and (5).

$$S_S \times (NA_S)^2 < 4 \times S_F \times (NA_F)^2 \quad (4)$$

$$NA_S < 0.1 \quad (5)$$

According to this construction, since the screen size $S_S$ of the spatial modulation element, the laser beam emission numerical aperture $NA_S$ of the spatial modulation element, the cross-sectional area $S_F$ of the fiber bundle and the numerical aperture $NA_F$ of the fiber bundle satisfy the equations (4) and (5), input efficiency of the modulated laser beam to the fiber bundle can be maintained high and the miniaturization of an optical component between the spatial modulation element and the fiber bundle can also be realized.

In the above projector, the projection angle adjusting mechanism preferably illuminates the display space in a defocus state by relatively changing a distance between the output plane of the fiber bundle and the projection lens. According to this construction, dark parts caused by a cladding of the fiber bundle disappear and the display space can be uniformly illuminated since the display space is illuminated in the defocus state.

INDUSTRIAL APPLICABILITY

A projector of the present invention can not only present images and information in a space, but also be used for various spatial presentations such as illumination and decoration and is particularly suitable for the realization of augmented realities in various spaces.

What is claimed is:

1. A projector, comprising:
   a fiber bundle including a plurality of cores fixedly arranged on an input plane and an output plane;
   a laser beam source for emitting a laser beam having a directivity;
   an optical guide unit for modulating the laser beam emitted from the laser beam source into a two-dimensional image and guiding the modulated laser beam as the two-dimensional image to the input plane of the fiber bundle;
   a projection lens for enlarging and projecting the laser beam, as the two-dimensional image, emerging from the output plane of the fiber bundle to a display space; and
   a projection angle adjusting mechanism for adjusting a projection angle of the projection lens.

2. A projector according to claim 1, further comprising a main projection lens for enlarging and projecting the laser beam modulated by the optical guide unit to another display space without guiding it to the fiber bundle.

3. A projector according to claim 2, further comprising an optical element for splitting or switching the laser beam modulated by the optical guide unit to or between the main projection lens and the fiber bundle.

4. A projector according to claim 3, wherein:
   the optical element includes a reflective polarizing element,
   the optical guide unit includes a modulation element or an optical component for rotating a polarization direction of the modulated laser beam, and
   the reflective polarizing element splits or switches the laser beam according to the polarization direction of the modulated laser beam.

5. A projector according to claim 1, wherein the cores of the fiber bundle are non-periodically arranged.

6. A projector according to claim 1, wherein the number of the cores of the fiber bundle is smaller than the number of pixels of a spatially modulated image.

7. A projector according to claim 1, wherein core diameters of the fiber bundle are larger in an outer peripheral part than in a central part of the fiber bundle.

8. A projector according to claim 1, wherein the optical guide unit includes a spatial modulation element for modulating the laser beam emitted from the laser beam source and a reduction projection optical system for reducing and projecting the laser beam modulated by the spatial modulation element to the input plane of the fiber bundle.

9. A projector according to claim 8, further comprising a main projection lens for enlarging and projecting the laser beam reduced and projected by the reduction projection optical system to another display space without guiding it to the fiber bundle.

10. A projector according to claim 2, wherein the optical guide unit includes a spatial modulation element for modulating the laser beam emitted from the laser beam source and, in the case of guiding the laser beam only to the input plane of the fiber bundle, an illumination area reducing unit for reducing an illumination area of the spatial modulation element.

11. A projector according to claim 1, wherein:
    the laser beam source modulates the light intensity of the laser beam, and
    the optical guide unit further includes a scanning mirror for scanning and spatially modulating the laser beam and a condenser lens for condensing the laser beam scanned by the scanning mirror on the input plane of the fiber bundle.

12. A projector according to claim 11, further comprising a main projection lens for enlarging and projecting the modulated laser beam to another display space without guiding it to the fiber bundle,
    wherein the scanning mirror scans an imaging plane of the laser beam to the fiber bundle and the main projection lens.

13. A projector according to claim 10, further comprising a speckle noise removing mechanism for temporally changing the phase of the laser beam enlarged and projected by the main projection lens.

14. A projector according to claim 1, wherein:
    the optical guide unit includes a spatial modulation element for modulating the laser beam emitted from the laser beam source and a condensing optical system for condensing the laser beam modulated by the spatial modulation element on the input plane of the fiber bundle without focusing it on the input plane of the fiber bundle, and
    the projection lens enlarges and focuses the laser beam emerging from the output plane of the fiber bundle.

15. A projector according to claim 1, wherein:
    the projection angle adjusting mechanism repeatedly vibrates the projection lens during a period of projecting the laser beam from the projection lens, and
    the projection angle of the laser beam projected from the projection lens is adjusted during a movement of the display space.

16. A projector according to claim 1, further comprising an input plane vibrating mechanism for temporally vibrating the input plane of the fiber bundle in an in-plane direction.

17. A projector according to claim 1, wherein the input and output planes of the fiber bundle have rectangular shapes.

18. A projector according to claim 2, wherein either one of the modulated laser beam enlarged and projected by the projection lens and that enlarged and modulated by the main projection lens is a positive image and the other is a negative image.

19. A projector according to claim 18, further comprising a coupling lens for coupling a laser beam emitted from the projection lens and a laser beam emitted from the laser beam source, wherein the optical guide unit includes a spatial modulation element for modulating the laser beam emitted from the laser beam source, and the laser beam source modulates the light intensity of the laser beam to be emitted in accordance with an image signal input to the spatial modulation element.

20. A projector according to claim 1, wherein:

the optical guide unit includes a spatial modulation element for modulating the laser beam emitted from the laser beam source, the spatial modulation element switches a direction of a modulation pattern in the case of rotating the orientation of an image enlarged and projected from the projection lens by 180°, the projection angle adjusting mechanism axially rotates the projection lens in the case of rotating the orientation of the image enlarged and projected from the projection lens by an angle below 90°, and the spatial modulation element switches the direction of the modulation pattern and the projection angle adjusting mechanism axially rotates the projection lens in the case of rotating the orientation of the image enlarged and projected from the projection lens by an angle equal to or larger than 90° and below 180°.

21. A projector according to claim 1, wherein:

the optical guide unit includes a spatial modulation element for modulating the laser beam emitted from the laser beam source, and a screen size $S_s$ of the spatial modulation element, a laser beam emission numerical aperture $NA_s$ of the spatial modulation element, a cross-sectional area $S_F$ of the fiber bundle and a numerical aperture $NA_F$ of the fiber bundle satisfy the following equations (1) and (2).

$$S_s \times (NA_s)^2 < 4 \times S_F \times (NA_F)^2 \tag{1}$$

$$NA_s < 0.1 \tag{2}$$

22. A projector according to claim 1, wherein the projection angle adjusting mechanism illuminates the display space in a defocus state by relatively changing a distance between the output plane of the fiber bundle and the projection lens.

* * * * *